United States Patent
Biswal et al.

(10) Patent No.: US 9,340,894 B2
(45) Date of Patent: May 17, 2016

(54) ANODE BATTERY MATERIALS AND METHODS OF MAKING THE SAME

(75) Inventors: Sibani Lisa Biswal, Houston, TX (US); Madhuri Thakur, Houston, TX (US); Michael S. Wong, Houston, TX (US); Steven L. Sinsabaugh, Uniontown, OH (US); Mark Isaacson, Santa Clara, CA (US)

(73) Assignees: William Marsh Rice University, Houston, TX (US); Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 13/589,588

(22) Filed: Aug. 20, 2012

(65) Prior Publication Data

US 2013/0045420 A1   Feb. 21, 2013

Related U.S. Application Data

(60) Provisional application No. 61/525,392, filed on Aug. 19, 2011.

(51) Int. Cl.
*H01M 4/38* (2006.01)
*C25F 3/12* (2006.01)
(Continued)

(52) U.S. Cl.
CPC .. *C25F 3/12* (2013.01); *H01B 1/04* (2013.01); *H01M 4/0442* (2013.01);
(Continued)

(58) Field of Classification Search
CPC ... H01M 4/134; H01M 4/1395; H01M 4/386; H01M 4/621; C25F 3/12
See application file for complete search history.

(56) References Cited

U.S. PATENT DOCUMENTS 6,413,672 B1 *  7/2002  Suzuki et al. ............ 429/231.95
2004/0121559 A1 *  6/2004  Solanki ...................... 438/460
(Continued)

FOREIGN PATENT DOCUMENTS

CN    101304929 A    11/2008
JP    200885238      4/2008
(Continued)

OTHER PUBLICATIONS

Arico, A. S. et al., "Nanostructured materials for advanced energy conversion and storage devices", Nature Materials, 4, 366-377 (2005).
(Continued)

*Primary Examiner* — Ula C Ruddock
*Assistant Examiner* — Lisa S Park
(74) *Attorney, Agent, or Firm* — Winstead PC

(57) ABSTRACT

In some embodiments, the present invention provides novel methods of preparing porous silicon films and particles for lithium ion batteries. In some embodiments, such methods generally include: (1) etching a silicon material by exposure of the silicon material to a constant current density in a solution to produce a porous silicon film over a substrate; and (2) separating the porous silicon film from the substrate by gradually increasing the electric current density in sequential increments. In some embodiments, the methods of the present invention may also include a step of associating the porous silicon film with a binding material. In some embodiments, the methods of the present invention may also include a step of splitting the porous silicon film to form porous silicon particles. Additional embodiments of the present invention pertain to anode materials derived from the porous silicon films and porous silicon particles.

6 Claims, 15 Drawing Sheets

(51) Int. Cl.
  *H01B 1/04* (2006.01)
  *H01M 4/04* (2006.01)
  *H01M 4/134* (2010.01)
  *H01M 4/1395* (2010.01)
  *H01M 4/62* (2006.01)

(52) U.S. Cl.
  CPC .......... *H01M 4/0471* (2013.01); *H01M 4/134* (2013.01); *H01M 4/1395* (2013.01); *H01M 4/386* (2013.01); *H01M 4/622* (2013.01); *Y02E 60/122* (2013.01)

(56) References Cited

U.S. PATENT DOCUMENTS

| | | | |
|---|---|---|---|
| 2004/0126072 A1 | 7/2004 | Lee et al. | |
| 2004/0214085 A1* | 10/2004 | Sheem et al. | 429/218.1 |
| 2005/0191550 A1* | 9/2005 | Satoh et al. | 429/217 |
| 2006/0251562 A1* | 11/2006 | Farrell et al. | 423/324 |
| 2007/0269411 A1 | 11/2007 | Sun et al. | |
| 2008/0280140 A1 | 11/2008 | Ferrari et al. | |
| 2009/0186267 A1* | 7/2009 | Tiegs | 429/129 |
| 2009/0227063 A1 | 9/2009 | Ravi et al. | |
| 2009/0326520 A1 | 12/2009 | Lee et al. | |
| 2011/0111294 A1 | 5/2011 | Lopez et al. | |
| 2013/0034714 A1* | 2/2013 | Canham et al. | 428/219 |

FOREIGN PATENT DOCUMENTS

| | | | |
|---|---|---|---|
| JP | 2010251647 | | 11/2010 |
| WO | 2008088298 | | 7/2008 |
| WO | WO2011/041468 | * | 4/2011 |

OTHER PUBLICATIONS

Tarascon, J. M. et al., "Issues and challenges facing rechargeable lithium batteries", Nature, 414, 359-367 (2001).
Simon, P. et al., "Materials for electrochemical capacitors", Nature Materials, 7, 845-854 (2008).
Kang, B. et al., "Battery materials for ultrafast charging and discharging", Nature, 458, 190-193 (2009).
Besenhard, J. O. et al., "Will advanced lithium-alloy anodes have a chance in lithium-ion batteries?", Journal of Power Sources, 68, 87-90 (1997).
Boukamp, B. A. et al., "All-solid lithium electrodes with mixed-conductor matrix", Journal of the Electrochemical Society, 128, 725-729 (1981).
Chan, C. K. et al., "High-performance lithium battery anodes using silicon nanowires", Nature Nanotechnology, 3, 31-35 (2008).
Cui, L. F. et al., "Crystalline-Amorphous Core-Shell Silicon Nanowires for High Capacity and High Current Battery Electrodes", Nano Letters, 9, 491-495 (2009).
Gao, B. et al., "Alloy Formation in Nanostructured Silicon", Advanced Materials, 13, 816-819 (2001).
Moradian, R. et al., "Ab initio density functional theory investigation of Li-intercalated silicon carbide nanotube bundles", Physics Letters A, 373, 2260-2266 (2009).
Kang, D. K. et al., "Microstructured Nanopore-Walled Porous Silicon as an Anode Material for Rechargeable Lithium Batteries", Journal of the Electrochemical Society, 155, A276-A281 (2008).
Yao, Y. et al., "Interconnected Silicon Hollow Nanospheres for Lithium-Ion Battery Anodes with Long Cycle Life", Nano Letters, 11, 2949-2954 (2011).
Thakur, M. et al., "The Use of Nanoporous Silicon for Advanced Rechargeable Lithium-Ion Batteries", 2009 AIChE Annual Meeting: Nashville, TN, Nov. 8-13, 2009.
Turner, D. R., "Electropolishing silicon in hydrofluoric acid solutions", Journal of the Electrochemical Society, 105, 402-408 (1958).
Solanki, C. S. et al., "Self-standing porous silicon films by one-step anodizing", Journal of the Electrochemical Society, 151, C307-C314 (2004).
Solanki, C. S. et al., New Approach for the Formation and Separation of a Thin Porous Silicon Layer, Phys. Stat. Sol. (a) 182, 97-101 (2000).
Parkhutik, V., "Porous silicon—mechanisms of growth and applications", Solid State Electronics, 43, 1121-1141 (1999).
Green, M. et al., "Structured silicon anodes for lithium battery applications", Electrochemical and Solid State Letters, 2003, 6, A75-A79.
Ryu, J. H. et al., "Failure modes of silicon powder negative electrode in lithium secondary batteries", Electrochemical and Solid State Letters, 2004, 7, A306-A309.
Li, H. et al., "A high capacity nano-si composite anode material for lithium rechargeable batteries", Electrochemical and Solid State Letters, 1999, 2, 547-549.
Graetz, J. et al., "Highly reversible lithium storage in nanostructured silicon", Electrochemical and Solid State Letters, 2003, 6, A194-A197.
Kasavajjula, U. et al., "Nano- and bulk-silicon-based insertion anodes for lithium-ion secondary cells", Journal of Power Sources, 2007, 163, 1003-1039.
Hatchard, T.D. et al., "In situ XRD and electrochemical study of the reaction of lithium with amorphous silicon", Journal of the Electrochemical Society, 2004, 151, A838-A842.
Obrovac, M.N. et al., "Alloy Design for Lithium-Ion Battery Anodes", Journal of the Electrochemical Society, 2007, 154, A849-A855.
Li, J. et al., "An In Situ X-Ray Diffraction Study of the Reaction of Li with Crystalline Si", Journal of the Electrochemical Society, 2007, 154, A156-A161.
Shin, H.C. et al., "Porous silicon negative electrodes for rechargeable lithium batteries", Journal of Power Sources, 2005, 139, 314-320.
International Searching Authority, International Search Report and Written Opinion for International Application No. PCT/US2012/051543, filed Aug. 20, 2012.
International Bureau, International Preliminary Report on Patentability, Mar. 6, 2014, PCT/US2012/051543, Application date Aug. 20,2012.
European Patent Office, European Search Report, Mar. 4, 2015, Application No. 12824945.5, "Anode Battery Materials and Methods of Making the Same".
Intellectual Property Office of Singapore, Search Report, Sep. 20, 2015, Application No. 2014011282, "Anode Battery Materials and Methods of Making the Same".
Intellectual Property Office of Singapore, Written Opinion, Sep. 20, 2015, Application No. 2014011282, "Anode Battery Materials and Methods of Making the Same".
China State Intellectual Property Office, First Office Action, Oct. 27, 2015, Application No. 201280051456.X, "Anode Battery Materials and Methods of Making the Same".
Taiwan IPO, Official Letter, Jan. 22, 2016, Application No. 101130128, "Anode Battery Materials and Methods of Making the Same".

* cited by examiner

A

B

C

D

A

B

A

B

ANODE BATTERY MATERIALS AND METHODS OF MAKING THE SAME

CROSS-REFERENCE TO RELATED APPLICATIONS

This application claims priority to U.S. Provisional Patent Application No. 61/525,392, filed on Aug. 19, 2011. The entirety of the aforementioned application is incorporated herein by reference.

BACKGROUND

Porous silicon films and particles have numerous electrochemical applications, including use as anode materials in lithium ion batteries. However, current methods to make porous silicon films and particles suffer from numerous limitations, including efficiency, quality, electrochemical efficacy, mass production ability, and cost-effectiveness. Therefore, there is currently a need for new methods to produce porous silicon films and particles that address the aforementioned limitations.

BRIEF SUMMARY

In some embodiments, the present disclosure provides novel methods of preparing porous silicon films. In some embodiments, such methods generally include: (1) etching a silicon material by exposure of the silicon material to an electric current density to produce a porous silicon film over a silicon substrate; and (2) separating the porous silicon film from the silicon substrate by gradually increasing the electric current density in sequential increments. In some embodiments, the etching of the silicon material may include the use of an acid, such as hydrofluoric acid. In some embodiments, the gradual increase of the electric current density during the separating step may include a sequential increase of the electric current density by about 1-2 $mA/cm^2$ per sequential increment for at least 5 to 10 increments.

In some embodiments, the methods of the present disclosure may also include a step of associating the porous silicon film with a binding material, such as binders, carbon materials, polymers, metals, additives, and combinations thereof. In some embodiments, the binding materials may include polymers, such as polyacrylonitrile (PAN), polyvinylidene difluoride (PVDF), polyacrylic acid (PAA), carboxymethyl cellulose (CMC), and combinations thereof. In some embodiments, the binding material may be carbonized before, during or after association with porous silicon films.

In some embodiments, the methods of the present disclosure may also include a step of splitting the porous silicon films to form porous silicon particles. Thus, additional embodiments of the present disclosure pertain to methods of preparing porous silicon particles (also referred to as microparticulates and granules). In some embodiments, the splitting may form porous silicon particles with diameters that range from about 1 μm to about 50 μm. In some embodiments, the splitting may occurs physical grinding, crushing, sonication, ultrasonic fracture, pulverization, ultrasonic pulverization, and combinations of such methods.

Further embodiments of the present disclosure pertain to anode materials that may be derived from the porous silicon films or porous silicon particles of the present disclosure. In some embodiments, the anode materials may include porous silicon films or porous silicon particles with a plurality of pores; and a binding material associated with the porous silicon films or particles. In some embodiments, the binding materials may include at least one of binders, carbon materials, polymers, metals, and combinations thereof. In some embodiments, the plurality of pores may comprise diameters between about 1 nanometer to about 5 micrometers, or from about 500 nanometers to about 3 micrometers. In some embodiments, the anode materials of the present disclosure may be used as components of lithium ion batteries.

BRIEF DESCRIPTION OF THE FIGURES

FIG. 1A is a depiction of the initial stage of MPSF formation at current density of 2 $mA/cm^2$ for 1 hour. FIG. 1C illustrates the branching of the formed pores as the current density is increased (e.g., from about 1 $mA/cm^2$ to about 15 $mA/cm^2$) for several minutes. FIG. 1E shows the formed macroporous layer separated from bulk silicon. FIGS. 1B, 1D and 1F are corresponding scanning electron micrograph (SEM) images of the process.

FIG. 3G provides the X-ray diffraction (XRD) spectrum of MPSF with and without pyrolyzed PAN.

FIG. 7A provides a process to generate micron-size macroporous silicon/pyrolyzed PAN composite micro-particulates from a free standing macroporous silicon film. FIG. 7B provides corresponding SEM images for the freestanding MPSF, the macroporous silicon micro-particulates, and the composite of particulates/pyrolyzed PAN. FIG. 7C provides a volume comparison of 50 mg powder of macroporous silicon micro-particulates (MPSP) with non-porous silicon particulates.

FIG. 8C shows the Brunauer-Emmett-Teller (BET) isotherm for macroporous silicon particulates. The classic description for a BET isotherm distinguishes between macropores (>50 nm, Type II), mesopores (2 nm> and <50 nm, Type IV) and micropores (<2 nm, Type I).

FIG. 10A provides a comparison of the discharge capacity and coulombic efficiency of composites of macroporous and non-porous silicon/pyrolyzed PAN micro-particulates as a function of cycle number. FIG. 10B provides the data relating to the optimization of the electrochemical performance of the ratio of macroporous silicon micro-particulates/pyrolyzed PAN composite. FIG. 10C shows the voltage profiles of the macroporous silicon micro-particulates/pyrolyzed PAN composite electrode after 1, 10, 50, 100, 150 and 170 cycles at a rate of C/5 between 0.01-1 V in half-cells at constant charge capacity of 1000 mAhg$^{-1}$. FIG. 10D shows the differential capacity curve of the macroporous silicon micro-particulates/pyrolyzed PAN composite electrode after the $1^{st}$ and $2^{nd}$ cycles.

FIG. 11A provides an SEM image of the surface morphology of non-porous silicon micro-particulates after electrochemical cycling for 50 cycles. FIG. 11B provides surface morphology of macroporous silicon micro-particulates after 50 cycles.

FIG. 12A shows the discharge capacity and coulombic efficiency vs. cycle number for MPSP/pyrolyzed PAN during galvanostatic charge/discharge between 0.01-1V at constant charge capacity of 1000 mAh/g for rate of C/2. Insert shows cycling between 0.01-1V at constant charge capacity of 1000 mAh/g for a rate of C/5. FIG. 12B shows the voltage profiles of the macroporous silicon micro-particulates/pyrolyzed PAN composite electrode after 1, 100, 200, 300, 400 and 500 cycles at a rate of C/2 between 0.01-1 V in half-cells at constant charge capacity of 1000 mAhg$^{-1}$.

DETAILED DESCRIPTION

Figure 1:
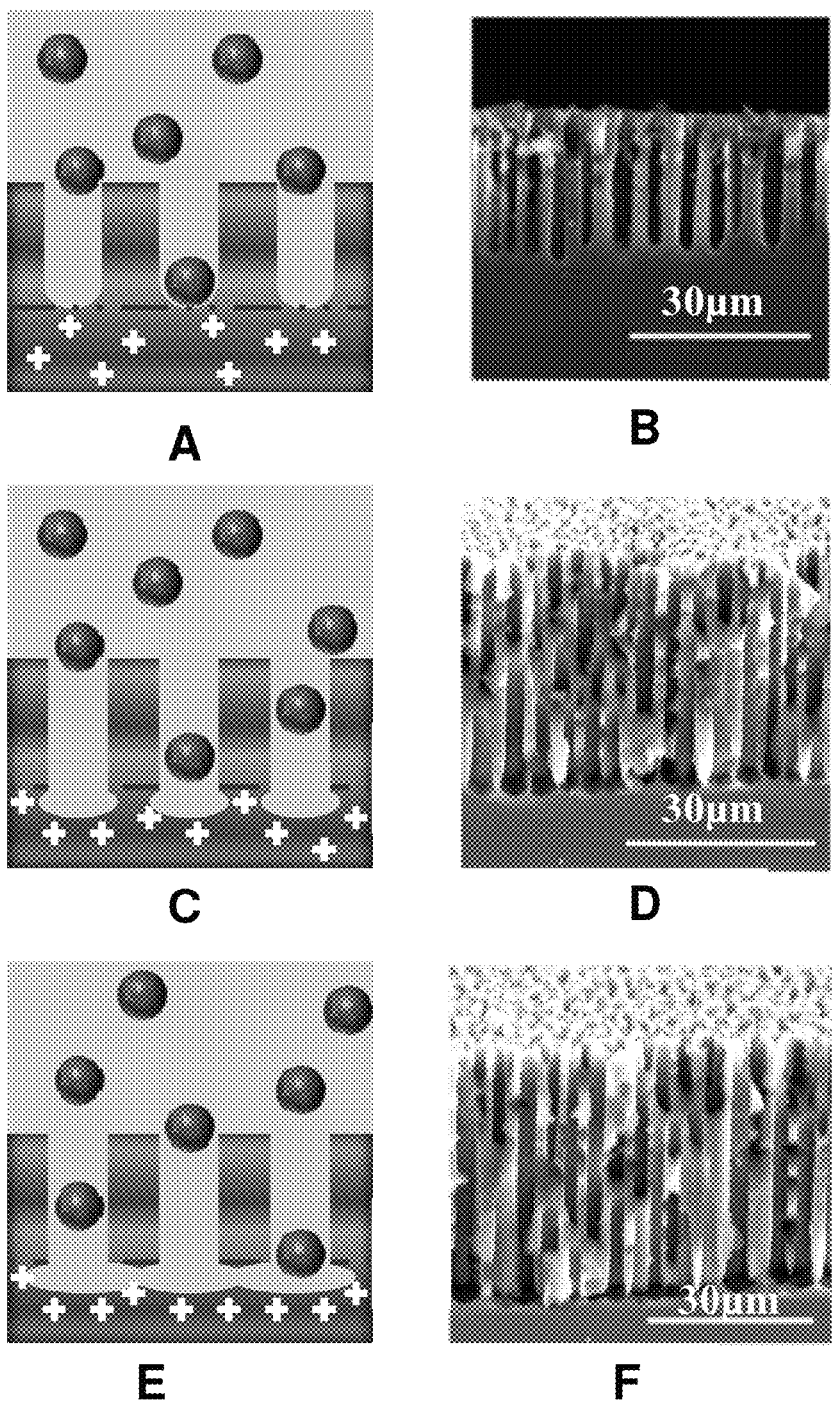
FIG. 1 provides a schematic of macroporous silicon film (MPSF) formation.

It is to be understood that both the foregoing general description and the following detailed description are illustrative and explanatory, and are not restrictive of the subject matter, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

The section headings used herein are for organizational purposes and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

Lithium(Li) ion batteries have a higher energy density than most other types of rechargeable batteries. This is due to Li being one of the most electropositive elements (−3.04V versus standard hydrogen electrode), and the lightest electrochemically active metal. Accordingly, lithium ion batteries can store more energy than other types of rechargeable batteries.

The three primary functional components of a Li ion battery are the anode, the cathode, and electrolytes. A variety of materials may be used for such components. Commercially, the most popular material for the anode is graphite or carbon, which has a specific capacity of ~372 mAh/g. Such materials can lead to the formation of $LiC_6$. Developing a new electrode material with higher energy capacity can lead to a significant improvement in the performance and lifetimes of products that use rechargeable batteries. In this regard, considerable efforts have been made to improve the performance of Li ion batteries (LIB).

There are a number of new approaches that are being undertaken to create rechargeable lithium ion batteries with higher energy capacities and longer life cycles. The capacity of lithium ion battery depends upon the amount of Li ion an anode material can hold. One of the materials which react with the lithium at low potential is silicon. Silicon is an attractive material because it can react with lithium to form binary alloys with a maximum uptake of 4.4 lithium atoms per silicon atom ($Li_{22}Si_5$). At room temperature, the highest achievable specific capacity for silicon is 3579 mAh/g. This value is far greater than the theoretical capacity of graphite. However, the lithium insertion and extraction from silicon is associated with a large volume expansion (~300%). Such volume expansion can result in severe cracking of the silicon, thereby leading to electrode failure. In fact, it is believed that lithiation-induced stress and structural destruction of silicon in batteries are the main cause for capacity loss during charge/discharge.

Accordingly, a variety of silicon structures and silicon-carbon based composites have been examined for reducing the lithiation-induced stress and the structural destruction of silicon. Examples include the use of pure Si micro and nanoscale particle anodes, Si dispersed in an active/inactive matrix, Si mixed with different binders, and both amorphous and crystalline Si thin films. However, the large volume change in Si upon lithium insertion can be accommodated by carbon only for a limited degree, thereby offering only limited stability and capacity enhancement.

To address these needs, binder free electrodes, such as silicon nanowires and silicon core-shell nanowires, have been tested. These nanowires are directly grown on a substrate. Furthermore, these nanowires have a small diameter (e.g., 10-200 nm). This compactness allows for the rapid transport of lithium ion. The compactness also improves the capacity and cycleability of the anode, especially when they are compared to bulk silicon and silicon microstructures. However, the cycleability of these silicon nanowires in Li ion batteries has been limited to less than 50 charge/discharge cycles. Furthermore, the commercial use of these silicon nanowires for large number of cycles is not feasible, primarily due to their weak adhesion with the substrate. Furthermore, there are limitations with the manufacture of these nanowires. Such limitations include lack of sufficient control over pore volume, wire length, diameter, uniformity, and production costs.

Attempts have been made to address the aforementioned limitations by creating silicon with mesoporous structures, such as Si—C nanocomposite granules. For instance, the pre-existing pores in the mesoporous Si—C nanocomposites can provide the volume needed for silicon expansion. The pores can also allow for the fast transport of lithium ions. Likewise, the carbon can allow for improved solid electrolyte interface formation, structural integrity, and high electric conductivity.

The aforementioned mesoporous Si/carbon core-shell nanowires show improvement in capacity and cycleability. However, the manufacture of these structures is costly and inefficient. In particular, the manufacture of many of these structures requires difficult or expensive processing steps, thereby limiting their potential for commercialization.

Another alternative approach to improve the life cycle and capacity of silicon materials is the use of binder free porous silicon electrodes that consist of microstructured nanopore-walled porous silicon. Such materials have been considered as promising candidates because they can be manufactured in a cost-effective manner. Furthermore, since the materials are compatible with common semiconductor techniques, they can be easily scaled up.

However, a challenge with the use of porous silicon films is their poor adherence to current collectors, a key factor in electrochemical performance. To alleviate this problem, many groups have included additional surface treatments, such as metal coatings. However, such approaches have been costly.

Another limitation with these porous silicon films has been their association with bulk silicon substrates that do not contribute to the specific capacity of the materials. Such materials may in turn lead to an increase in the weight of the anode. Some groups have removed this bulk silicon substrate through backside chemical etching processes. However, such methods increase the cost of the silicon materials.

Accordingly, in view of the aforementioned defects, more optimal methods are needed to make porous silicon materials for electrochemical applications. The present disclosure addresses this need.

In some embodiments, the present disclosure provides novel methods for preparing porous silicon films and porous silicon particles (also referred to as particulates or granules). In some embodiments, the present disclosure pertains to anode materials that are derived from the porous silicon films and porous silicon particles of the present disclosure.

Methods of Preparing Porous Silicon Films and Porous Silicon Particles

Figure 2:
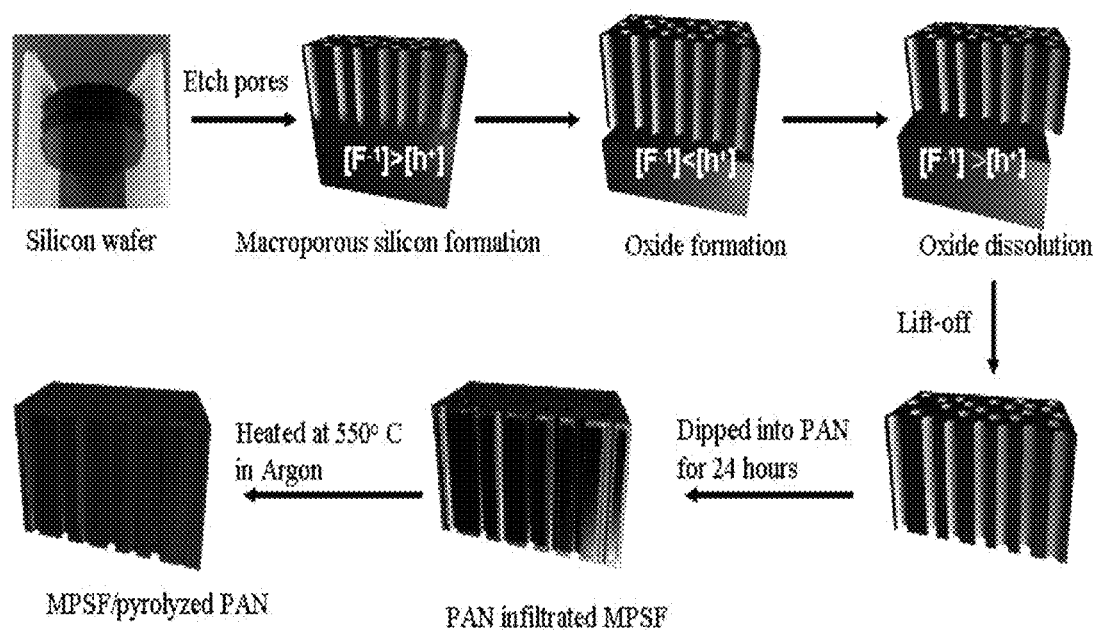
FIG. 2 provides a schematic for fabricating freestanding MPSF, associating the formed MPSFs with polyacrylonitrile (PAN), and carbonizing the PAN through pyrolysis.
Figure 7:
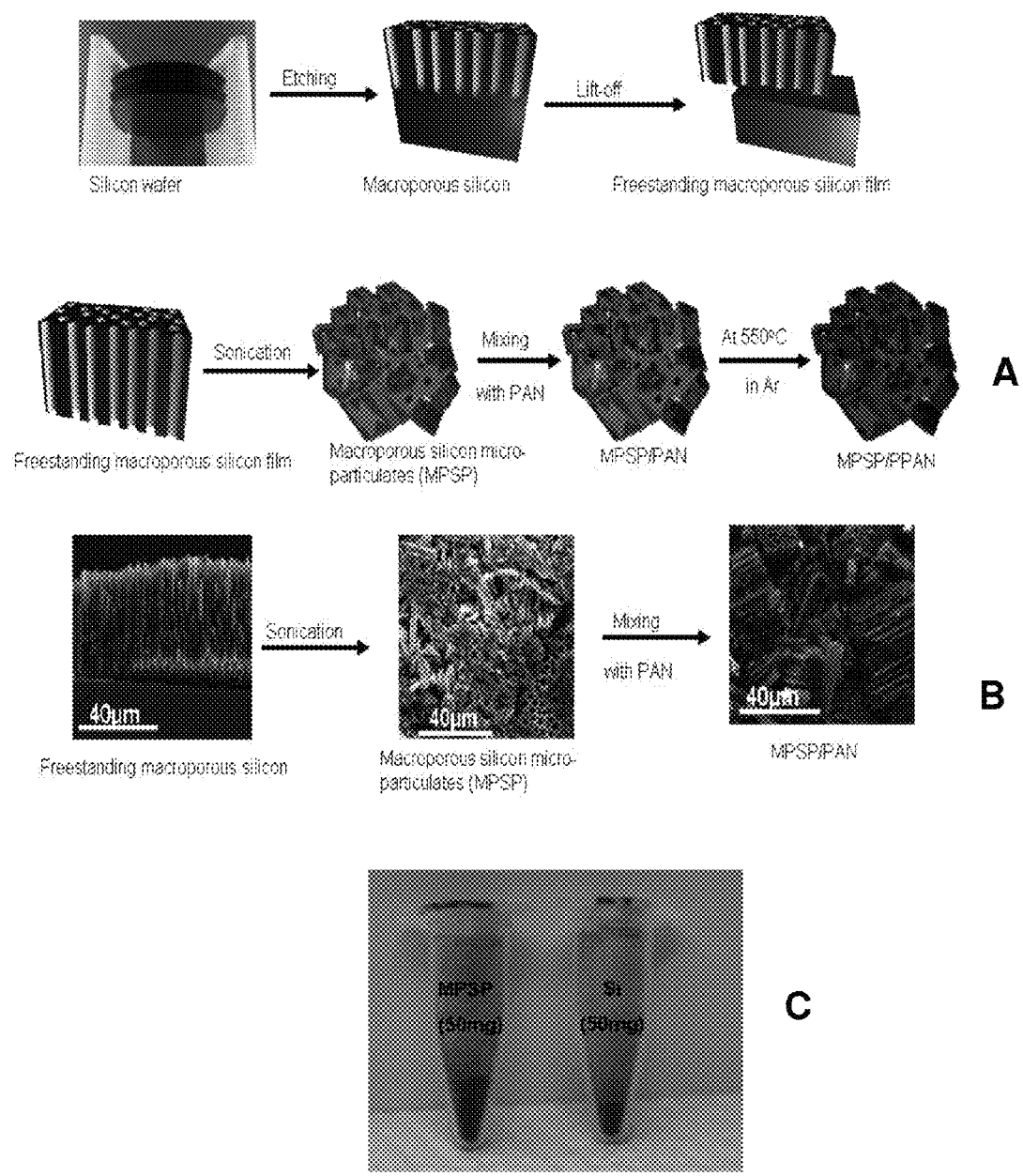
FIG. 7 provides additional schematics for MPSF and particulate formation.

Various methods may be used to prepare porous silicon films and porous silicon particles. Some embodiments of such methods are illustrated in FIGS. 1-2, and 7. In some embodiments, the methods of the present disclosure generally include: (1) etching a silicon material (e.g., silicon wafer) by exposure of the silicon material to an electric current density (e.g., a constant current density) to form a porous silicon film over a silicon substrate; and (2) separating the porous silicon film from the silicon substrate by gradually increasing the electric current density in sequential increments. Such steps result in the formation of freestanding porous silicon films.

In some embodiments, the methods of the present disclosure may also include a step of associating porous silicon films with a binding material, such as pyrolized polyacrylonitrile (PPAN). In some embodiments, the methods of the present disclosure may also include a step of splitting the formed porous silicon films into several pieces to form porous silicon particles.

Additional details about these methods and their variations are set forth herein as non-limiting examples. In particular, the methods of the present disclosure may utilize various silicon materials, etching techniques, separation procedures, binding materials, binding techniques, and splitting procedures.

Silicon Materials

Various silicon materials may be used as precursors of freestanding porous silicon films and porous silicon particles. In some embodiments, the silicon materials may include a bulk silicon substrate. In some embodiments, the silicon materials may include a silicon wafer, such as a crystalline silicon wafer. In some embodiments, the silicon wafer may be a doped silicon wafer. In some embodiments, the silicon wafer may be doped with boron, phosphorous, arsenic, antimony, other dopants, and combinations thereof. In some embodiments, the silicon wafer may be a p-type silicon wafer, an n-type silicon wafer, and combinations thereof. In some embodiments, the silicon wafer may be an n-doped or a boron doped silicon wafer. In more specific embodiments, the silicon materials may include a prime grade, boron doped, p-type (100) silicon wafer with a thickness of about 275±25 µm, and a resistivity between about 14-22 ohm-cm. The use of additional silicon materials can also be envisioned.

Etching

Various methods may also be used to etch silicon materials. In some embodiments, the etching may include the use of one or more strong acids, such as nitric acid ($HNO_3$), hydrofluoric acid (HF), sulfuric acid ($H_2SO_4$), hydrochloric acid (HCl), and the like. In some embodiments, the etching may occur in the presence of an applied electric field, such as an electric field with a constant electric current density. In some embodiments, the etching may occur by the use of a strong acid (e.g., HF) in the presence of an applied electric field.

In some embodiments, the applied electric field may contain various levels of electric current density. In some embodiments, the electric current density may be from about 0.5 $mA/cm^2$ to about 50 $mA/cm^2$. In some embodiments, the maximum electric current density may be about 20 $mA/cm^2$. In some embodiments, the electric current density may be applied to the silicon materials in an electrochemical cell.

During etching, an electric current density may be applied to silicon materials in one or more increments. In some embodiments, the etching process may include from 1 increment to about 10 increments. In some embodiments, the electric current density may be from about 1 $mA/cm^2$ to about 20 $mA/cm^2$ per increment. In some embodiments, each increment may last from about 30 seconds to about 60 minutes. In some embodiments, each increment may last for about 10 minutes. In some embodiments, the increments may be separated by intervals. In some embodiments, the intervals may be from about 30 seconds to about 30 minutes.

In some embodiments, the etching of silicon materials may result in the formation of a porous silicon film over a silicon substrate ("silicon substrate" generally refers to the un-etched silicon material below the formed porous silicon film). In some embodiments, the pores in the porous silicon films may have diameters that range from about 1 nanometer to about 10 micrometers. In some embodiments, the pores in the porous silicon films may have diameters that are less than about 2 nanometers (i.e., micropores). In some embodiments, the pores in the porous silicon films may have diameters that are from about 2 nanometers to about 50 nm (i.e., mesopores). In some embodiments, the pores in the porous silicon films may have diameters that more than about 50 nm (i.e., macropores). In some embodiments, the pores in the porous silicon films may have diameters that are from about 1 nanometer to about 10 micrometers, about 2 nanometers to about 10 micrometers, about 1 nanometer to about 5 micrometers, about 50 nanometers to about 5 micrometers, about 500 nanometers to about 3 micrometers, about 200 nanometers to about 2 micrometers, or about 1 micrometer to about 2 micrometers.

In some embodiments, an applied electrochemical density may lead to isotropic etching at the tip of the formed pores.

Lift Off Procedures

In the present disclosure, a "lift off" procedure refers to a process that separates a formed porous silicon film from a silicon substrate. Such a separation can occur during or after etching. Furthermore, various methods may be used to separate a porous silicon film from a silicon substrate.

In some embodiments, the separating step may occur by increasing the electric current density that is applied to the silicon materials during etching. In some embodiments, the separating step may include a gradual increase of the applied electric current density in sequential increments until the porous silicon film has been separated from the silicon substrate.

As used herein, a gradual increase in electric current density generally refers to a stepwise increase in electric current density over several sequential increments. For instance, in some embodiments, the electric current density may increase gradually in at least 5-10 sequential increments that may last from about 30 seconds to 60 minutes per increment. In some embodiments, the gradual increase in electrical current density may occur through at least 5 to 10 sequential increments that may be separated by intervals of about 30 seconds to 60 minutes per increment.

In some embodiments, the applied electric current density may be from about 0.5 mA/cm$^2$ to about 50 mA/cm$^2$. In some embodiments, the electric current density may gradually increase from about 1 mA/cm$^2$ to about 2 mA/cm$^2$ per increment. In some embodiments, the maximum electric current density may be about 15 mA/cm$^2$. In some embodiments, the electric current density may gradually increase in small increments of 1 mA/cm$^2$ at 10-60 minutes per increment for up to 15 mA/cm$^2$. In some embodiments, the electric current density may gradually increase in 13 sequential increments by at least about 1 mA/cm$^2$ per increment for up to 15 mA/cm$^2$. In some embodiments, the electric current density may gradually increase in small increments of 0.5 mA/cm$^2$ at 1-2 hours per increment for up to 20 mA/cm$^2$.

Without being bound by theory, it is envisioned that the aforementioned "lift off" procedures may occur through various mechanisms. For instance, in some embodiments that utilize HF as an etchant, it is envisioned that, as the depth of the pores in the formed porous silicon films increases, the availability of fluoride ions at the pore tip decreases. Such a decrease may in turn lead to isotropic etching at the tip of the pores, thereby resulting in a layer of silicon that is more porous at the point of contact with the silicon substrate. See, e.g., FIG. 1. In this embodiment, it is also envisioned that the hydrogen byproduct accumulates and starts to exert a hydrodynamic pressure onto the walls of the pores. At some point, the pore walls may not be able to withstand this hydrodynamic pressure. This in turn may lead to separation of the porous silicon film from the silicon substrate.

The separation or "lift off" procedures of the present disclosure may also include additional steps. For instance, in some embodiments, separation steps may also include a step of physically removing the formed porous silicon film from the silicon substrate. In some embodiments, the physical removal may occur by the use of a razor blade, a tweezer, or other objects. In some embodiments, the physical removal may occur by a rinsing step or a washing step.

Association with Binding Materials

In the methods of the present disclosure may also include a step of associating porous silicon films with one or more binding materials. In various embodiments, the association may occur prior to, during, or after porous silicon film formation.

Binding materials generally refer to materials that may enhance the electric conductivity or stability of porous silicon films. In some embodiments, the binding materials may include at least one of binders, additives (e.g., carbon additives), carbon materials (e.g., carbon nano fibers), polymers, metals, and combinations thereof.

In some embodiments, the binding materials may include one or more polymers. Exemplary polymers may include, without limitation, polyacrylonitrile (PAN), polyvinylidene difluoride (PVDF), polyacrylic acid (PAA), carboxymethyl cellulose (CMC), and combinations thereof. In some embodiments, the polymers may be in polymerized form prior to association with porous silicon films. In some embodiments, the polymers may polymerize during or after association with porous silicon films.

In some embodiments, the binding material may include carbonized PAN. An advantage of using PAN as a binding material is that it forms conjugated carbon chains upon carbonization. This in turn can enhance the electrical properties of the porous silicon films.

In some embodiments, the binding materials may include one or more metals. In some embodiments, the metals may include, without limitation, gold, copper, silver, titanium, iron, and combinations thereof.

In some embodiments, the binding materials may include one or more carbon materials. Non-limiting examples of suitable carbon materials may include carbon nanotubes, carbon black, graphite, carbon fibers, carbon nano fibers, graphene sheets, fullerenes, graphene platelets, sodium alginate binders associated with carbon black, and combinations thereof.

In addition, various methods may be used to associate binding materials with porous silicon films. In some embodiments, the association may occur by sputtering, spraying, or physically applying the one or more binding materials onto the porous silicon films. In some embodiments, the association may occur by dipping the porous silicon films into a solution containing one or more binding materials.

In some embodiments, the association may result in the partial coating of the porous silicon film with a binding material. In some embodiments, the association may result in the full coating of the porous silicon film with a binding material. In some embodiments, the porous silicon films may become infiltrated with, embedded with or dispersed in the binding materials.

Carbonization of Binding Materials

In some embodiments, the binding materials that are associated with porous silicon films may also be in carbonized form. In some embodiments, the binding materials may become carbonized before, during, or after association with the porous silicon films. In some embodiments, the binding materials may become carbonized by pyrolysis before, during or after association with porous silicon films. In more specific embodiments, the binding materials may include PAN that has been carbonized by pyrolysis after association with porous silicon films. In some embodiments, pyrolysis may occur by heating porous silicon films at high temperatures (e.g., 550° C.) in the presence of an inert gas (e.g., Argon).

Splitting of Porous Silicon Films

In some embodiments, the porous silicon films of the present disclosure may also be split into small porous silicon particles (also referred to as particulates or granules). In some embodiments, the splitting may occur by physical grinding, crushing, sonication, ultrasonic fracture, pulverization, ultrasonic pulverization, and other similar techniques. In some embodiments, the porous silicon films may be split to form micron-size particulates or granules. In some embodiments, the particulates may range from about 5 µm to about 50 µm in diameter, and include pore sizes that are greater than about 50 nm. In some embodiments, the splitting may occur before, during or after association of the porous silicon films with binding materials. In some embodiments, the splitting may occur before, during or after the carbonization of the binding materials.

In more specific embodiments, the porous silicon films may be sonicated to form macroporous silicon micro-particulates with diameters between about 10 µm to about 50 µm. The macroporous silicon micro-particulates may also contain micropores and mesopores on the walls of the pore structures. This example is illustrated in FIG. 7. In this example, a freestanding porous silicon film is crushed into micrometer-sized particulates by ultrasonication for hours. The formed particulates are then mixed with polyacrylonitrile (PAN) and then pyrolyzed under argon atmosphere.

Derived Products

Additional embodiments of the present disclosure pertain to porous silicon films and porous silicon particles (i.e., particulates or granules) that are formed in accordance with the methods of the present disclosure. The porous silicon films and porous silicon particles that are formed in accordance with the methods of the present disclosure can have various structures. In some embodiments, the porous silicon films and porous silicon particles may include a plurality of pores of various sizes. In some embodiments, the porous silicon films and particles of the present disclosure may have pores with diameters that range from about 1 nanometer to about 10 micrometers. In some embodiments, the porous silicon films and porous silicon particles of the present disclosure may have pores with diameters of less than about 2 nm (i.e., micropores), between 2 nm and 50 nm (i.e., mesopores), more than about 50 nm (macropores), or combinations of such pore diameters. In some embodiments, the porous silicon films and porous silicon particles of the present disclosure may include macroporous structures with pores containing diameters that are more than about 50 nm (also referred to as macroporous silicon films or macroporous silicon particles). In some embodiments, the pores in the porous silicon films and porous silicon particles may have diameters that are from about 1 nanometer to about 10 micrometers, about 2 nanometers to about 10 micrometers, about 1 nanometer to about 5 micrometers, about 50 nanometers to about 5 micrometers, about 500 nanometers to about 3 micrometers, about 200 nanometers to about 2 micrometers, or about 1 micrometer to about 2 micrometers.

In some embodiments, the pores in the porous silicon films and porous silicon particles may have depths that range from about 5 micrometers to about 200 micrometers. In some embodiments, the pores in the porous silicon films and porous silicon particles may span at least from about 10% to about 100% of a thickness of the film or particle. In some embodiments, the pores in the porous silicon films and porous silicon particles may span at least from about 50% to 100% of a thickness of the film or particle. In some embodiments, the pores in the porous silicon films and porous silicon particles may span an entire thickness of the film or particle.

In some embodiments, the porous silicon films and porous silicon particles of the present disclosure may have thicknesses that range from about 5 micrometers to about 200 micrometers. In some embodiments, the porous silicon films and porous silicon particles of the present disclosure may have thicknesses that range from about 10 micrometers to about 50 micrometers.

Additional embodiments of the present disclosure pertain to anode materials that may contain the aforementioned porous silicon films or porous silicon particles. In some embodiments, the anode materials may include porous silicon films or particles with pore diameters between about 1 nanometer to about 10 micrometers, as previously described. In some embodiments, the porous silicon films or particles in the anode materials may have thicknesses ranging from about 10 micrometers to about 200 micrometers, as also previously described. In addition, the porous silicon films and particles in the anode materials may be associated with various binding materials, as previously described.

In some embodiments, binding materials associated with the anode materials may include carbon materials, polymers, metals, and combinations of such materials. In some embodiments, the binding materials may include gold. In some embodiments, the binding materials may include a carbonized binding material, such as pyrolyzed polyacrylonitrile.

The anode materials of the present disclosure can also have various advantageous properties. For instance, in some embodiments, the anode materials may have a capacity of at least about 600 mAh/g, and a coulombic efficiency of at least about 90%. In some embodiments, the anode materials of the present disclosure may have a capacity of at least about 1000 mAh/g, and coulombic efficiencies of at least 95%. In some embodiments, the anode materials of the present disclosure may have a capacity of at least about 1000 mAh/g for at least 50 charge/discharge cycles, 100 cycles, 150 cycles, 200 cycles, 250 cycles, 300 cycles, 350 cycles, 400 cycles, 450 cycles, 500 cycles, or 550 cycles. In some embodiments, the anode materials of the present disclosure may retain at least 50% of a theoretical capacity for at least about 50 charge/discharge cycles.

In some embodiments where anode materials are mixed with PAN or binding materials with carbon additives, the anode materials may have charge capacities of 600 mAh/g, 800 mAh/g, 1000 mAh/g or 1200 mAh/g, with coulombic efficiencies of more than 98%. In some embodiments, such charge capacities may last for at least 50 charge/discharge cycles, 100 cycles, 150 cycles, 200 cycles, 250 cycles, 300 cycles, 350 cycles, 400 cycles, 450 cycles, 500 cycles, or 550 cycles.

Applications and Advantages

The methods and materials of the present disclosure provide various applications and advantages. For instance, due to the novel "lift off" procedures that utilize a gradual increase in electric current density, the methods of the present disclosure can be used to produce porous silicon films that are freestanding, intact, lightweight, and compact. Furthermore, multiple lift off procedures can be performed on a single silicon material, thereby leading to minimal silicon material waste. Accordingly, the methods of the present disclosure can be performed in an expedited and cost-effective manner.

Furthermore, the methods of the present disclosure can allow users to control the thickness, pore diameter and porosity of the pores in the porous silicon films. Such properties can be controlled by varying etching conditions, such as current, wafer resistivity, electrolyte concentration, and doping of the silicon materials. For instance, in some embodiments, the porosity and depth of the porous silicon films can be controlled by varying the electric current density or concentration of hydrofluoric acid.

In addition, and as set forth in more detail in the Examples herein, the porous silicon films and particles of the present disclosure can have various advantageous electrochemical properties. For instance, many of the porous silicon films and particles of the present disclosure (e.g., macroporous silicon particulates with pyrolyzed PAN) can be used to deliver enhanced discharge capacities, better cycle lives, and enhanced coulombic efficiency. In particular, the pores of many of the porous silicon films and particles of the present disclosure can accommodate the volume expansion in the silicon during lithiation. Accordingly, the pores can be capable of alloying large amounts of lithium ions through a large number of charge/discharge cycles. In fact, as set forth in the Examples herein, Applicants have observed that the capacity and cycleability of many of the porous silicon particles of the present disclosure is higher than the current anode materials in lithium ion batteries.

In some embodiments, the porous silicon films and particles of the present disclosure may help develop lithium ion batteries with improved cycling behavior and high capacity. In some embodiments, the materials of the present disclosure may have a cycleability that is more than 50 charge/discharge cycles. In some embodiments, the macroporous silicon particles of the present disclosure may have at least 3 times the capacity of the currently used anode materials for more than 550 cycles.

Accordingly, the porous silicon films and particles of the present disclosure can be used for various purposes, including use as anode materials for lithium ion batteries. For instance, the materials of the present disclosure can find applications in the fields of information technology, consumer electronic devices, electric vehicles, implantable devices, and telecommunications. The materials derived from the present disclosure may also find applications in consumer electronics, the defense industry, and the automotive industry. The materials derived from the present disclosure may also find applications in storage of renewable energy and aerospace applications due to their high energy density.

Additional Embodiments

Reference will now be made to more specific embodiments of the present disclosure and experimental results that provide support for such embodiments. However, Applicants note that the disclosure below is for illustrative purposes only and is not intended to limit the scope of the claimed subject matter in any way.

Example 1

Development of Freestanding Macroporous Silicon Films

Here, Applicants present a novel "lift-off" method by which a freestanding macroporous silicon film (MPSF) is electrochemically detached from the underlying bulk silicon and combined with pyrolyzed polyacrylonitrile (PPAN), a conductive polymer that forms a conjugated-chain chemical structure. Applicants also report here the performance of these silicon thin films with and without pyrolyzed PAN.

Specifically, Applicants report in this Example a facile method to fabricate thin films of MPSF to be used as an anode material for lithium ion batteries (LIB). Unlike structured porous silicon or silicon nanowire arrays that have been previously reported, Applicants' thin films are electrochemically removed from the bulk silicon substrate. This freestanding MPSF is fabricated by electrochemical etching of silicon wafer in hydrofluoric acid (HF) solution using a multi-step lift-off procedure. To these porous silicon thin films, Applicants infiltrate PAN, a polymer binder. When PAN is pyrolyzed, it forms a conjugated-chain chemical structure with a specific capacity for lithium. Applicants' experimental results indicate that a compostite formed from freestanding MPSF and pyrolyzed PAN can deliver a specific capacity of 1200 mAhg$^{-1}$ and a better cycle life and coulombic efficiency compared to bare MPSF.

Example 1.1

Materials and Methods

Freestanding macroporous silicon film (MPSF) can be fabricated by etching crystalline silicon wafers with hydrofluoric acid and organic solvents at a constant electric current density. The porosity and depth of the porous silicon can be controlled by varying the current density or concentration of HF acid. Prior work has shown that the free-standing MPSF can be removed from the bulk silicon using either a one step process or a two step process. In the one step anodization liftoff procedure, the in-situ change in fluoride ion concentration results in the formation of a high porosity layer beneath a low porosity layer under the same etching conditions. The pores in the high porosity layer then eventually expand to overlap one another until the porous silicon breaks away from the substrate. In the two step procedure, a silicon wafer is first etched at a constant current density to create isotropic pores. Then, the current density is suddenly increased causing the base of the pores to expand and overlap, thus lifting the porous silicon from the bulk substrate.

To fabricate MPSF, Applicants have modified the two-step liftoff procedure described above. Prime grade, boron doped, p-type (100) silicon wafers with thickness of 275±25 μm and resistivity between 14-22 ohm-cm (Siltronix Corp) were used. First, pores are etched into the silicon wafers at a constant current density of 2 mA/cm$^{-2}$, delivered by an Agilent power supply (E3612A) at room temperature. The etch time determined the depth of the pores. For an etch time of 1 hour, the pore depth was typically twelve microns. The etching solution is composed of 30 mL dimethylformamide (DMF, Sigma Aldrich) and 4 mL 49% HF (Fisher Scientific) solution and was previously optimized to obtain pores with an average diameter of one micron. In the second step, Applicants deviated from the two step procedure described previously. Instead of using a sudden change, the current density was increased in small increments of 1 mA/cm$^2$ and held for 10-60 minutes at each increment up to 15 mA/cm$^2$.

This initial etching condition generates the macroporous silicon film, as illustrated in FIG. 1A and shown in a corresponding scanning electron microscope (SEM) image in FIG. 1B. Without being bound by theory, the macroporous silicon is formed in this embodiment when the number of fluoride ions is greater than the number of holes ([F$^-$]>[h$^+$]). The MPSF layer can be fabricated with an average pore diameter between 500 nm and 2 μm, and thicknesses between 10 and 50 μm by adjusting the current density or HF concentration. In this Example, Applicants etched the sample for 3 hours at 2 mAcm$^{-2}$ to create a macroporous silicon film of 36 μm thickness. During small increments of electric current density, the depth of the pores increases, and the availability of fluoride ions at the pore tip decreases ([F$^-$]<[h$^+$]). When the supply of the fluoride ion is insufficient, it starts forming a silicon dioxide rather than SiF$_6^{2-}$. This in turn leads to isotropic etching at the tip of the pores, thereby resulting in a layer of silicon that is more porous at the point of contact with the bulk silicon, as shown in FIGS. 1C-1D. Additionally, the hydrogen byproduct accumulates and starts to exert a hydrodynamic pressure onto the walls of the pores. At some point, the pore walls near the substrate are thin enough and are not able to withstand this hydrodynamic pressure. This leads to separation of the MPSF from the bulk silicon (substrate), as illustrated and shown in a corresponding SEM image in FIGS. 1E-1F.

After fabrication, the wafer with MPSF is removed from the etching cell and washed with the methanol and DI water. The MPSF is then dried in the vacuum for one hour. Once dry, the free-standing film can be physically lifted off with a razor blade and weighed to determine the silicon mass. This multistep liftoff procedure is reliable and can separate the MPSF off the bulk substrate in its entirety. The use of incremental increases in current density was a significant improvement over the two-step process, which frequently resulted in pieces of MPSF being removed at various times from the wafer. The process can then be repeated on the bulk silicon subtrate to generate multiple MPSFs from a single wafer, resulting in a cost-effective process with little Si wasted.

To form the MPSF with pyrolyzed PAN composite, the MPSF is treated with a PAN solution. A polyacryonitrile (PAN, $M_w$150,000, Sigma Aldrich) solution is made by dissolving 1 g of PAN into 100 mL of DMF and stirring at 60° C. for four hours. The freestanding MPSF is placed into the PAN solution in an argon atmosphere for 24 hours. After PAN infiltration, the MPSF/PAN film is heated to 550° C. for 1 hour to pyrolyze the PAN. FIG. 2 illustrates the infiltration and pyrolyzation of PAN into MPSF. For anodes, Applicants typically fabricate freestanding MPSFs that have an average pore diameter of 1.5 microns and a thickness of 50 microns.

Figure 3:
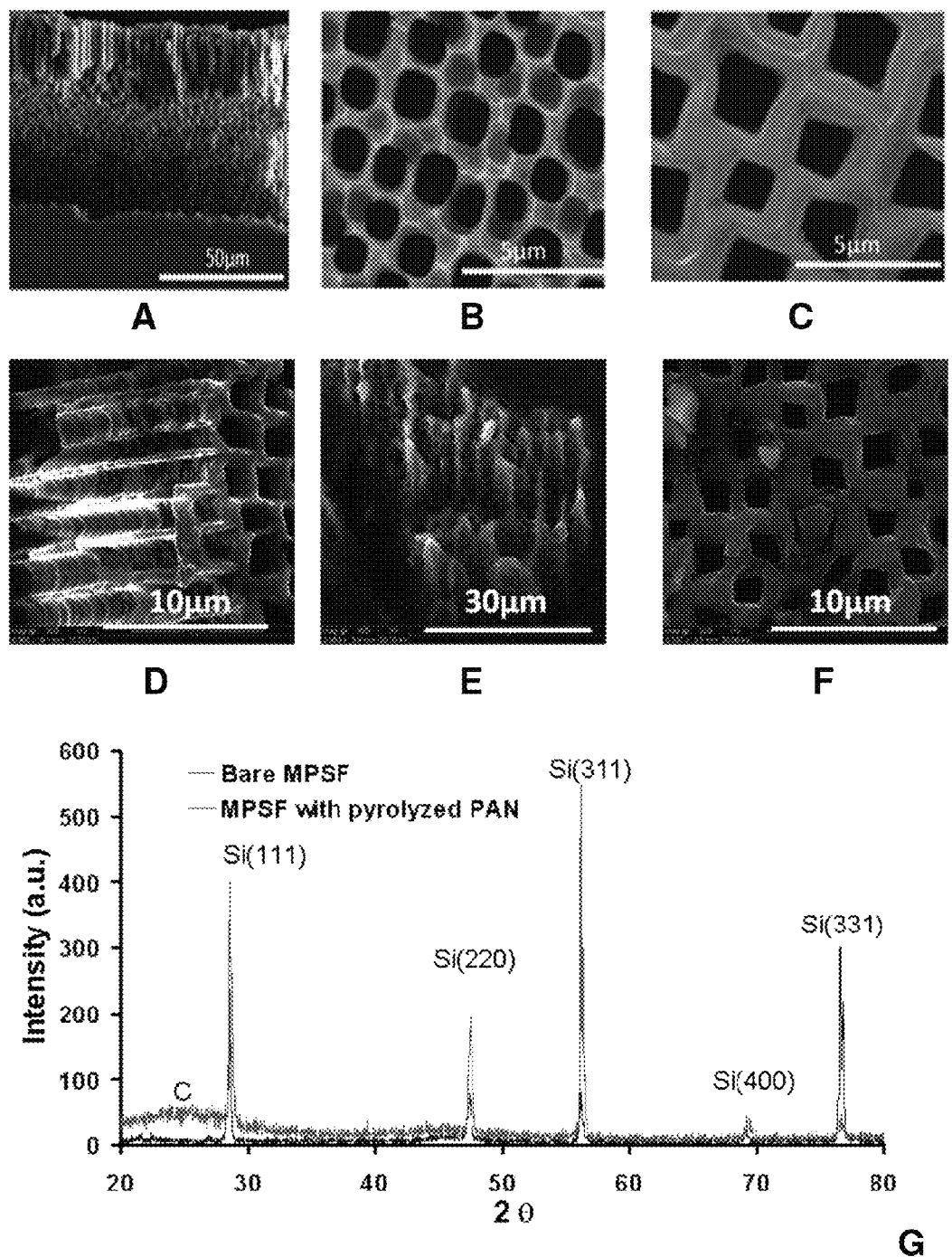
FIG. 3 shows SEM images of the surface morphology of MPSF, including free-standing MPSF (FIG. 3A), top-view (FIG. 3B), back-side view (FIG. 3C), side-view of PAN-coated MPSF (FIG. 3D), side-view of pyrolyzed PAN-coated MPSF (FIG. 3E), and back-view of pyrolyzed PAN-coated MPSF (FIG. 3F).

Scanning electron microscopy (SEM, FEI Quanta 400) images of a typical MPSF film are shown in FIG. 3. FIG. 3A shows the lift-off of the porous silicon film. Due to the increase in current density during the electrochemical etching process, the pores on the backside of the lift-off film are much larger than the front side, as shown in FIGS. 3B-C. FIG. 3D shows the side view of the MPSF with PAN. FIGS. 3E-F show the SEM top and side-view of the free-standing MPSF with pyrolyzed PAN.

To confirm PAN infiltration, chemical analysis was performed using an X-ray diffraction pattern (XRD). As shown in FIG. 3G, the results confirm both a carbon and silicon peak for the MPSF/pyrolyzed PAN, and only a silicon peak for the bare MPSF.

To characterize the pyrolyzed PAN, attenuated total reflection Fourier transform infrared (ATR FTIR) spectroscopy measurements were performed on the sample before and after pyrolysis at 550° C. The ATR FTIR spectra were obtained on a Digilab FTS 7000 equipped with a HgCdTe detector from 4000 to 600 (cm$^{-1}$) wavenumbers. All spectra were taken with a nominal spectral resolution of 4 cm$^{-1}$ in absorbance mode. All films were measured under ambient and dry conditions for several trials at different areas of the sample surface. Finally, the resistivity measurements of the sample were determined with a four point probe technique using the Keithley 2700 Multimeter Intergra Series. All films were measured at least seven to ten times on different areas of the sample under ambient and dry conditions. The conductivity was calculated using the resistivity value and the measured thickness of the sample.

Example 1.2

Results and Discussion

Figure 4:
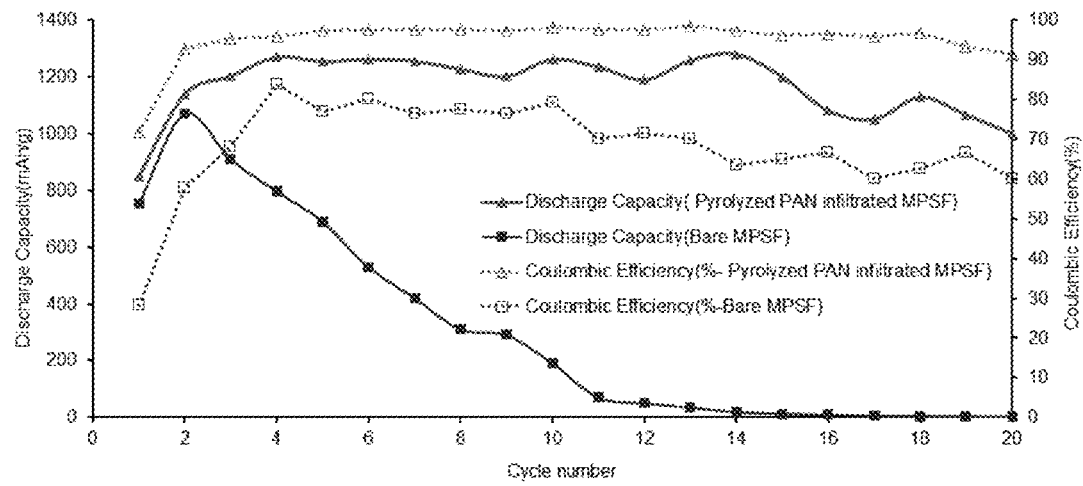
FIG. 4 shows a comparison of discharge capacity and coulombic efficiency as a function of cycle number for freestanding MPSF and pryolyzed PAN-coated MPSF. The analyses were performed during galvanostatic charge/discharge and tested between 0.07V-1.5V at 200 $\mu A/cm^2$.

The cycling performance of bare freestanding MPSF and MPSF with pyrolyzed PAN is shown in FIG. 4. For the MPSF with pyrolyzed PAN, the total mass of the anode is 4 mg measured using a microbalance (A&D—HR-202i, resolution 0.1 μg). The ratio of C to Si is 1:1. The first cycle discharge capacity for the MPSF/pyrolyzedPAN is 850 mAh/g$^{-1}$, whereas the bare MPSF is 757 mAh/g$^{-1}$. The bare MPSF rapidly drops in capacity after the second cycle, and is 200 mAh/g$^{-1}$ by cycle 10, and completely fails by cycle 15. For MPSF with pyrolyzed PAN, the discharge capacity increases for the first four cycles to a discharge capacity of 1260 mAhg$^{-1}$, and remains constant through cycle 20. This initial increase in capacity is typical for porous silicon films.

When analyzing galvanostatic cycling data, it is important to note the difference between the charge (lithiation) and discharge (delithiation) capacities, as this is an indication of reversibility (coulombic efficiency). The average columbic efficiency for MPSF with pyrolyzed PAN is above 90% after the 1$^{st}$ cycle, while the bare MPSF reaches a maximum of 83% after 4 cycles and then drops to 70%. These results indicate that the pyrolyzed PAN can improve the cycling and coulombic efficiency.

To analyze the PAN and understand its role in improving the performance of the MPSF as anode material for Li-ion battery, infrared spectroscopy measurement was performed before and after pyrolysis at 550° C. See FIG. 5. The infrared spectrum of the native PAN (red curve with structure (I) on inset) divulges its signature IR peaks: —CH and CH$_2$ aliphatic stretch (2800 to 3000 cm$^{-1}$) due to the hydrocarbon chain polymer backbone, —C≡N stretch (~2240 cm$^{-1}$) due to the nitrile group side chain, —CH$_2$ (~1458 cm$^{-1}$), and —CH (1365 cm$^{-1}$) bending due to the polymer backbone. After pyrolysis of the PAN, the broad aliphatic —CH and —CH$_2$ stretching vibrational peak (peak 1) and the distinct nitrile peak (peak 2) have apparently decreased in intensity while the peak due to —CH bending has increased (black curve). Interestingly, new IR bands have appeared in the spectrum, such as the broad peak between 1500 to 1650 cm$^{-1}$ (peak 3) and sharp peak at 1265 cm$^{-1}$ (peak 4), which are assigned to the —C═C and/or —C═N and —C—N functional groups, respectively. The appearance of a triplet in the former peak (peak 3, magnified right inset 2) implies the formation of a vinyl group in a conjugated ring. The same IR spectrum was obtained for the pyrolysis of the composite sample of PAN and MPSF. Therefore, the IR analysis of the pyrolyzed sample provide evidence of the presence of conjugated —C═C and —C═N sequences.

Figure 5:
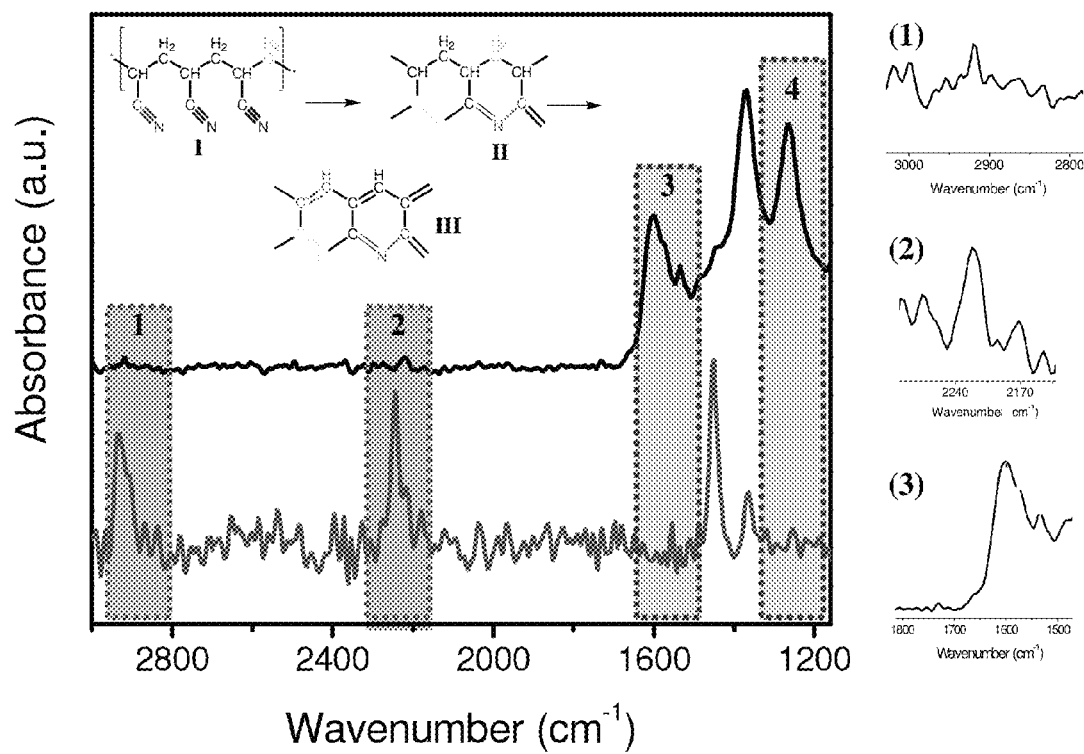
FIG. 5 provides an infrared (IR) spectrum of PAN before and after pyrolysis at 550° C. The chemical structures of proposed products are also shown. Focused IR regions are also shown at the right after pyrolysis. The focused IR regions are: (1) CH and $CH_2$ aliphatic stretch; (2) —C$\equiv$N stretch; and (3) —C$=$C and/or —C$=$N stretch.

The aforementioned results are supported by previous studies that suggested the formation of conjugated chain like structures after pyrolysis of PAN, and their proposed reaction pathway and chemical structures of the products, as shown on the inset of FIG. 5. The proposed structure III, which consists of a cyclic polymer chain with a delocalized π-electron system, has been reported to exhibit outstanding mechanical and relatively high electrical conductivity properties. Furthermore, earlier studies suggested the formation of singly (inset structure II) and doubly (inset structure III) conjugated structures of PAN after pyrolysis. It is noteworthy to mention that their IR data resembles that of FIG. 5, which revealed the emergence of —C═C and/or —C═N and —C—N peaks, proving the resulting conjugated cyclic structures of pyrolyzed PAN.

From the aforementioned results, Applicants envision that the products of the pyrolysis of PAN are composed of heterogeneous mixtures of II and III (mainly). The products may also contain trace amounts of the native PAN (I), since there are still the appearance of minute nitrile peak at ~2240 cm$^{-1}$ and CH$_2$ bending at ~1458 cm$^{-1}$. This is feasible since a relatively shorter amount of time was utilized to pyrolyze the sample. Moreover, since the sample was heated to 550° C., it is also possible that the pyrolyzed products may contain few amounts of the more conducting graphitic carbon, which was earlier reported.

In some embodiments applicable to LIBs, complete carbonization of the PAN may not be necessary. Without being bound by theory, it is envisioned that PAN can serve as a good binder for the MPSF. To investigate the electrical conductivity of the pyrolyzed PAN, standard four point probe measurements were performed on the PAN before and after pyrolysis at 550° C. As a summary, the conductivity of the innate PAN was determined to be $9.08 \times 10^{-1}$ S/m, which augmented to 2.36 S/m after pyrolysis at 550° C. This value is comparable to the previous conductivity of pyrolyzed PAN that is equal to 5 S/cm. Without being bound by theory, it is envisioned that the increased electrical conductivity of the PAN upon heating contributes to the improved performance of the MPSF as anode material for Li-ion battery.

Figure 6:
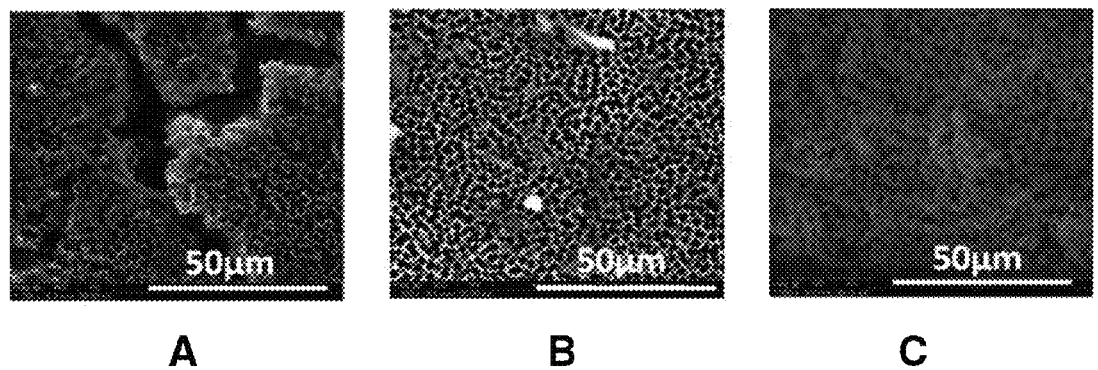
FIG. 6 shows SEM images of the surface morphologies of bare MPSF after 3 cycles (FIG. 6A), pyrolyzed PAN-coated MPSF after 3 cycles (FIG. 6B), and pyrolyzed PAN-coated MPSF after 20 cycles (FIG. 6C).

Applicants have observed that the pyrolyzed PAN porous silicon composite materials are better able to handle stress buildup during lithiation. As shown in FIG. 6, the surface morphology of bare MPSF (FIG. 6A) and MPSF with pyrolyzed PAN (FIG. 6B) is compared after three cycles. The bare MPSF contains cracks as a result of the large volume expansion in silicon during lithiation. The cracks form to relieve the stress buildup in the material and cause loss of contact with the current collector, resulting in a decrease in capacity and cycle life. The MPSF with pyrolyzed PAN contains no observable fractures after 3 cycles or even twenty cycles (FIG. 6C). The pyrolyzed PAN appears to act as a stress reliever during the expansion of silicon and prevent the cracking and eventual pulverization of the MPSF, thus improving capacity and lifetime.

Example 1.3

Summary

Applicants have demonstrated an inexpensive and facile process for generating MPSFs with pyrolyzed PAN as an anode material for lithium ion batteries. Applicants' results show that MPSF with pyrolyzed PAN has better cycle life compared to bare MPSF. Pyrolyzed PAN provides a number of benefits, including an increased electrical conductivity. This structure can also be fabricated using processing steps that are compatible with modern thin film processing techniques for easy scale up.

Example 2

Fabrication of Macroporous Silicon Films and Particulates

Example 2.1

Fabrication of Macroporous Silicon Films

Macroporous silicon samples were prepared by electrochemical etching of a single-crystal, (100)-oriented p-type silicon wafer (14-22 ohm-cm, Siltronix) by application of a constant current density of 2 mA/cm² for 4 hours in a 1:10 (v/v) electrolyte of 48% aqueous HF/DMF. A multi-step lift-off process was used to remove a freestanding macroporous silicon film from the crystalline silicon substrate. The freestanding hydrogen-terminated porous silicon film was then rinsed with methanol and DI water to take out any residues. After rinsing, the sample was ultrasonically fractured to synthesize micro-sized macroporous silicon particulates.

Example 2.2

Fabrication of Macroporous Silicon Particulates

The micro-sized macroporous silicon particulates were made by ultrasonication of 100 mg of free-standing macroporous silicon (MPS) into 1 ml of dimethylformamide (DMF, Sigma Aldrich). 100 mg of polyacrylonitrile (PAN, Sigma Aldrich) was dissolved into 2 ml of DMF for 4 hours with stirring at 60° C. Next, the PAN solution was mixed with the previously prepared micro-sized macroporous silicon particulates in a ratio of 1:1, 3:2, 7:3, 4:1 and 9:1 by stirring at the same temperature for 6 hours. The slurry was coated into the stainless steel foil and heated for hours at 550° C. in the presence of argon.

Example 3

Use of Macroporous Silicon Micro Particulates as Anode Materials

In this Example, Applicants report an inexpensive method to synthesize macroporous silicon particulates (MPSPs). When mixed with polyacrylonitrile (PAN) and pyrolyzed, MPSPs are capable of alloying with lithium resulting in capacities of 1000 mAhg$^{-1}$ over 500+ cycles. The advantage of using these sponge-like MPSP with pyrolyzed PAN is that the pores can accommodate the volume expansion in the silicon during the lithiation, and are capable of alloying large amounts of lithium ions through a large number of charge/discharge cycles. This performance combined with its low cost processing results in a material that is a competitive anode material for lithium ion batteries.

Specifically, Applicants report in this Example an inexpensive wet etch processing technique that can be used to generate gram quantities of macroporous silicon particulates (MPSPs). When combined with pyrolyzed polyacrylonitrile (PAN), MPSPs are able to cycle at a fixed capacity of 1000 mAhg$^{-1}$ over 550 cycles.

In Example 1, Applicants disclosed the development of freestanding macroporous silicon films as an anode for lithium ion batteries. These films offer a large surface area to volume ratio with controllable pore diameters. However, these films cannot be conveniently incorporated into current battery processing techniques, which utilize material slurries and roll to roll processing. To design a more processable material, Applicants changed from a film structure to a particulate structure that can be combined with PAN, or any binder to form a slurry that can be processed with standard coating technologies.

MPSPs are synthesized from freestanding macroporous silicon film. As described previously, freestanding macroporous silicon film is synthesized by electrochemical etching of prime grade, boron doped, p-type (100) silicon wafers (Siltronix Corp.) in 48% hydrofluoric acid (HF, Sigma Aldrich) and dimethylformamide (DMF, Sigma Aldrich) at a constant current density of 2 mAcm$^{-2}$ (as delivered by an Agilent power supply, E3612A) at room temperature. A multistep lift-off process is used to fabricate freestanding macroporous silicon films that are on the order of 10-200 microns thick with pore diameters greater than 50 nm. The resulting freestanding porous silicon is lifted from the bulk silicon by applying high current density of 20 mA/cm². After lift-off, the freestanding macroporous silicon film is ultrasonically fractured to create micro-particulates. The macroporous silicon micro-particulates are then mixed with PAN and stirred at 60° C. for four hours. The slurry is coated into 25 µm thick stainless steel foil (Alfa Aesar) using a drop cast method to create an anode. After coating, the anode is pyrolyzed in an argon atmosphere at a temperature of 550° C. for 1 hour. FIG. 7A illustrates the preparation of the freestanding macroporous silicon films, the sonication to form MPSPs, and the combination of MPSPs with pyrolyzed PAN. The advantage of wet-etch process is that it does not require costly vacuum or deposition processing.

FIG. 7B shows the corresponding scanning electron microscopic (SEM) images for the freestanding macroporous silicon film, the macroporous silicon micro-particulates, and the particulates combined with pyrolyzed PAN. From FIG. 7B, it is noticeable that the particulates are disordered fragments of the macroporous silicon film. What is significant is that, for the same mass of silicon, crushed silicon (formed by sonicating an untreated silicon wafer) has a much smaller volume when compared to Applicants' macroporous silicon particulates that are shown in FIG. 7C. For comparison, the specific surface area of macroporous versus crushed silicon micro-particulates (SEM shown in FIGS. 8A & B) are measured via nitrogen adsorption using the Brunauer-Emmett-Teller (BET) method (Isotherm shown in FIG. 8C).

Figure 8:
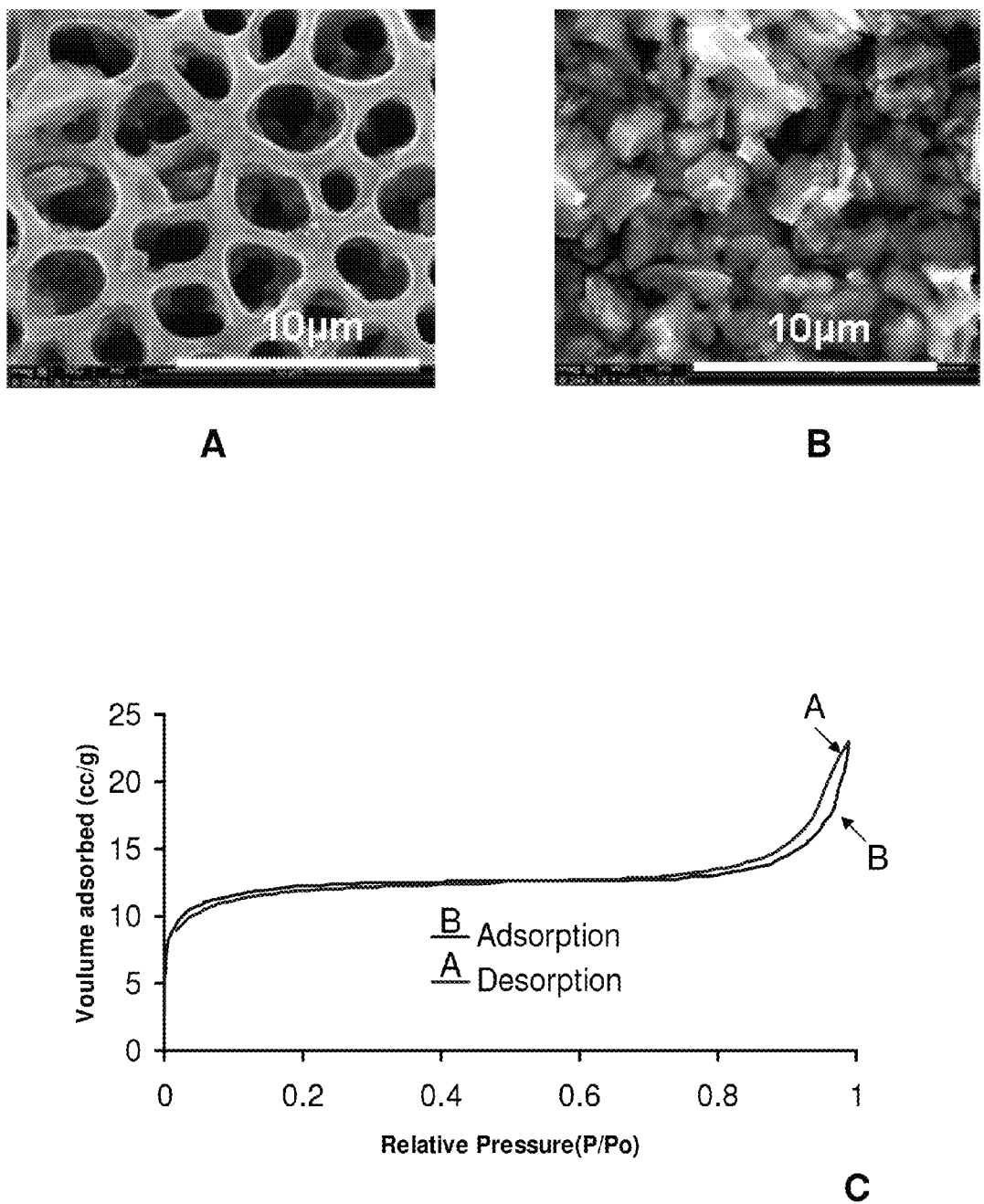
FIG. 8 shows SEM images of macroporous (FIG. 8A) and non-porous (FIG. 8B) silicon micro-particulates.

The classic description for a BET isotherm distinguishes between macropores (>50 nm, Type II), mesopores (2 nm> and <50 nm, Type IV) and micropores (<2 nm, Type I). The adsorption and desorption isotherm in FIG. 8C shows weak absorption at low pressures, corresponding to few micropores, and a steep adsorption curve at higher pressures, suggesting the presence of macropores. The isotherm also indicates an indefinite multi-layer formation after completion of the monolayer. Such patterns are typically found in adsorbents with a wide distribution of pore sizes. Near the first inflection (~10 cc/g), a monolayer is completed, following which adsorption occurs in successive layers The BET surface area of macroporous silicon micro-particulates is 46.85 m$^2$ (STP)g$^{-1}$(±0.12), whereas the crushed silicon micro-particulates have a surface area of 0.71 m$^2$(STP)g$^{-1}$ (±0.08 m$^2$/g). Though the physical dimensions of two particulates are similar, the surface area of the macroporous silicon is 40 times larger, indicating a highly porous silicon structure.

Figure 9:
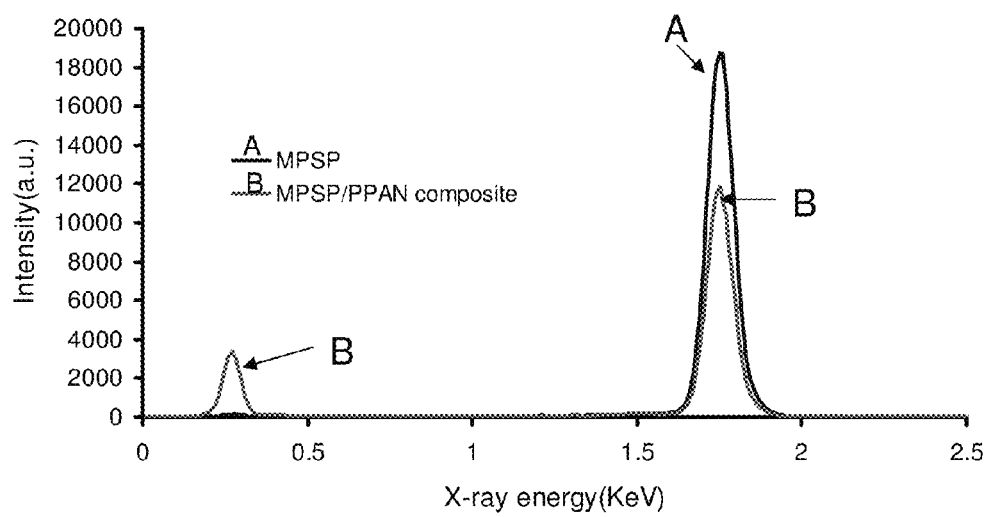
FIG. 9 shows the energy dispersive x-ray (EDX) spectrum (FIG. 9A) and the XRD spectrum (FIG. 9B) of macroporous silicon micro-particulates with and without pyrolyzed PAN. The X-ray photoelectron spectroscopy (XPS) (FIG. 9C), C1s peak (FIG. 9D) and N 1s peak (FIG. 9E) of the composites of macroporous silicon/pyrolyzed PAN micro-particulates are also shown.
Figure 9:
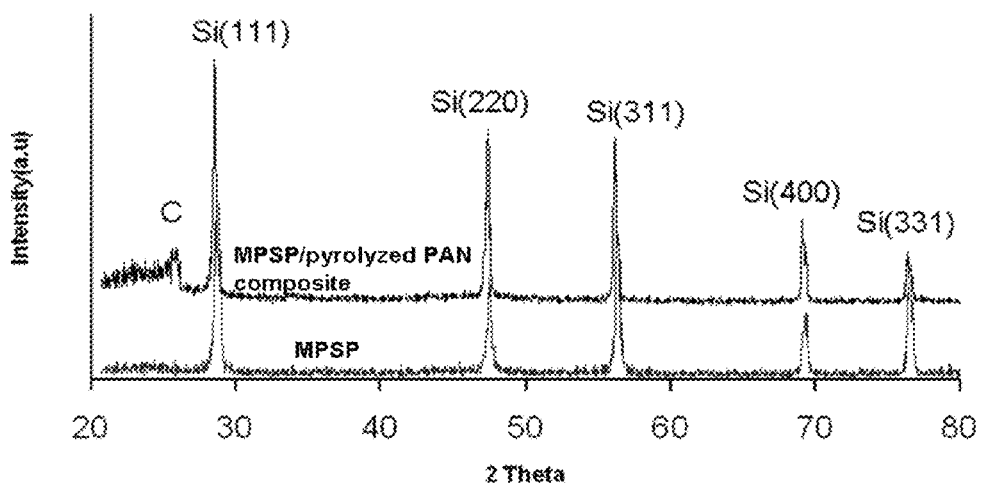
Figure 9:
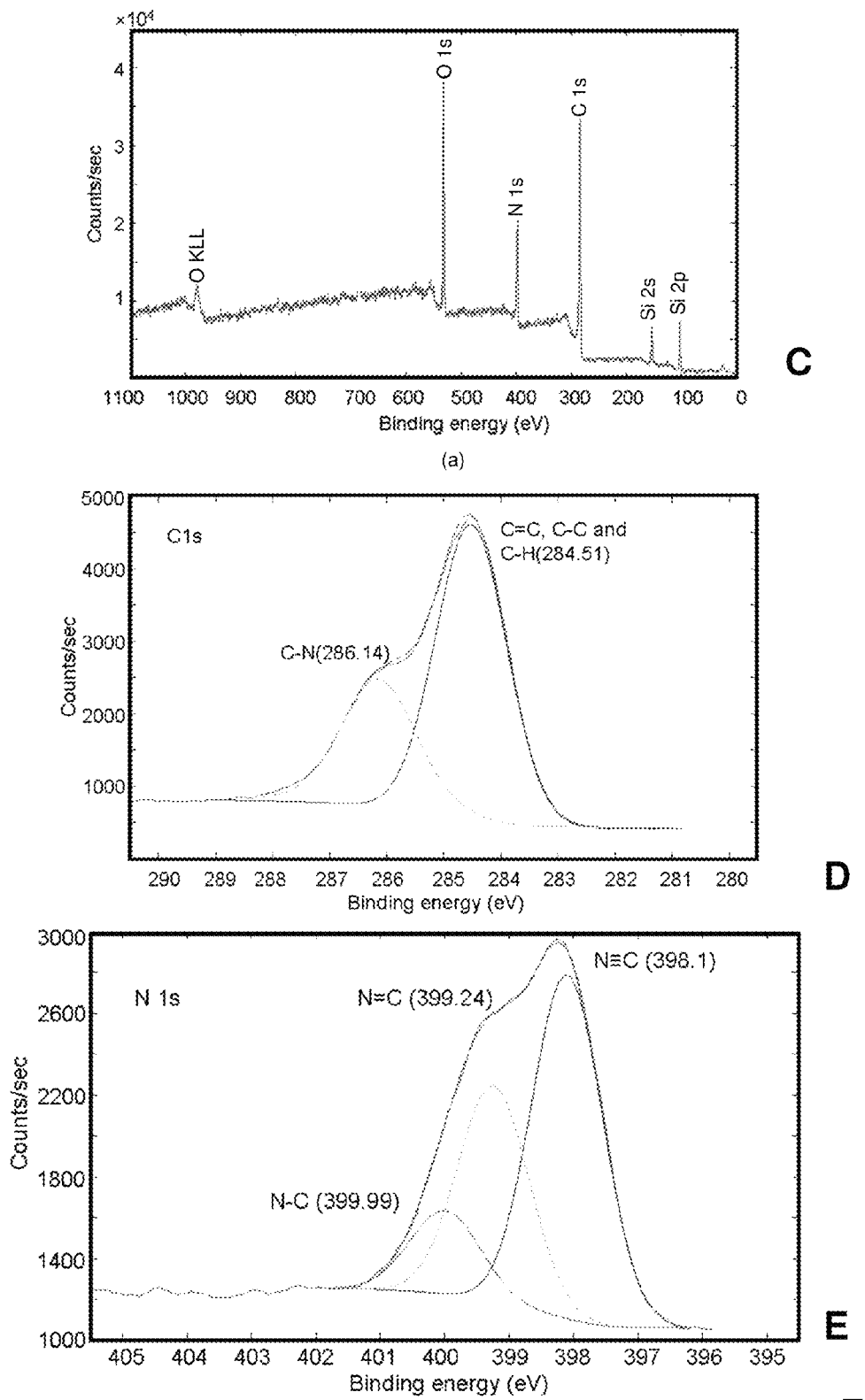

Chemical characterization comparing the macroporous silicon micro-particulates with and without pyrolyzed PAN is performed using energy-dispersive X-Ray spectroscopy (EDX), X-Ray diffraction (XRD) and X-ray photoelectron spectroscopy (XPS). See FIG. 9. The EDX and XRD of MPSPs with pyrolyzed PAN shows only a carbon and silicon signature, which indicates there is no formation of silicon carbide and negligible impurities in the material. See FIGS. 9A and B. Both techniques also exhibit identical silicon peaks for the materials. From XRD, the MPSPs with pyrolyzed PAN exhibit a weak and broad diffraction peak 2θ=25.96°, characteristic of a disordered carbon structure. XPS reveals the composition of the most external surface of the composite of macroporous silicon and pyrolyzed PAN micro-particulates. See FIG. 9C. The XPS analysis indicates that the major peaks are due to carbon (C 1s), oxygen (O1s), nitrogen (N1s) and silicon (Si2s and Si2p). FIGS. 9D-E present the high resolution scans for the elements of carbon (C 1s) and nitrogen (N 1s). The single symmetric peak at 284.5 Ev in the C1s spectra is due to carbon forming C—C and C—H bonds. In addition to the C—C peak, there is a peak corresponding to C—N at 286.2 eV. Applicants' results are supported by the previous studies that suggest that PAN undergoes a structural transition to form a conjugated-chain structure that is able to act as both a binder and a conductive matrix for silicon.

Electrochemical characterizing of the macroporous silicon micro-particulates is examined using galvanostatic cycling at room temperature using a half-cell. A 2-electrode test cell (Hosen) is constructed using the macroporous silicon micro-particulates as the anode and lithium foil as a counter electrode. Applicants carried out an experiment to optimize the ratio of macroporous silicon micro-particulates (MPSP) with pyrolyzed PAN, as shown in Table 1.

TABLE 1

Various mass ratios of MPSP:PAN (with their corresponding theoretical capacities) that were tested for performance.

| Sample | Ratio of MPSP:PAN | Theoretical capacity of MPSP (mAhg$^{-1}$) | Cycles at discharge capacity of 1000 mAh$g^{-1}$ |
|---|---|---|---|
| A | 9:1 | 3221 | 30 |
| B | 4:1 | 2863 | 170 |
| C | 7:3 | 2504 | 170 |
| D | 3:2 | 2147 | 123 |

The mass of all the samples tested is 2 mg/cm$^{-2}$. To increase the cycle life, Applicants charged/discharged all the samples at a constant charge capacity of 1000 mAhg$^{-1}$ between 1-0.01V. Applicants limited the charge capacity because prior work suggested that the volume expansion of the silicon can be limited by controlling the amount of lithium that intercalates into the silicon. This can greatly improve the cycleability of the cell. Prior work also found that limiting the intercalation of the silicon between 30%-50% of the maximum specific capacity would result in extended cycle life. Prior work also found that charging silicon microparticles and nanoparticles at constant charge capacity can increase the cycleability of the anode. This is also typical in commercial application of lithium ion batteries, where the cathode tends to limit the amount of lithium that can intercalate with the anode.

The cycle performance of samples A, B C and D are compared. See FIG. 10A. Samples B and C have better performance when compared to samples A and D. It is envisioned that when PAN is pyrolyzed, it acts as a binder as well as a conducting material. The cycle performance of sample A indicates that there is not enough PAN to provide structural support for the MPSPs, as well as a lack of conductive material, causing the sample to fail after 30 cycles. Sample D has more PAN relative to MPSP. It is able to run for more than 100 cycles, but the constant charge capacity begins dropping after the 120$^{th}$ cycle, probably due to the fact that the anode is cycling at a largest percentage (47%) of its theoretical capacity, resulting in faster anode degradation. Samples B and C have the optimum ratio of MPSP and PAN. Both the samples are able to run for more than 200 cycles with a 30% fade in the total charge capacity after 170 cycles.

Figure 10:
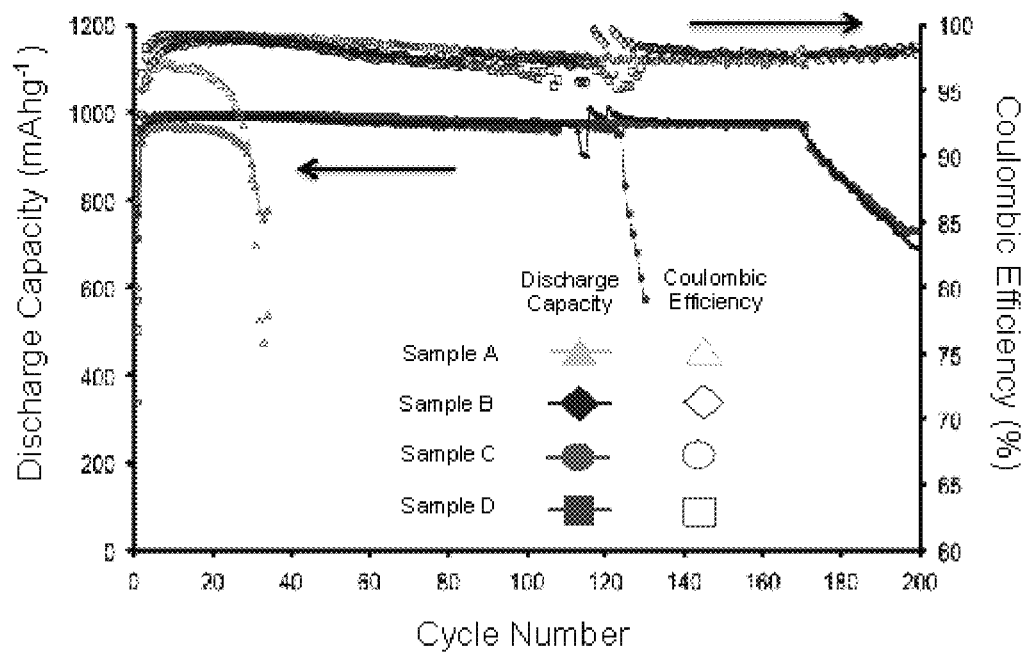
FIG. 10 provides electrochemical analyses of macroporous silicon micro-particulates.
Figure 10:
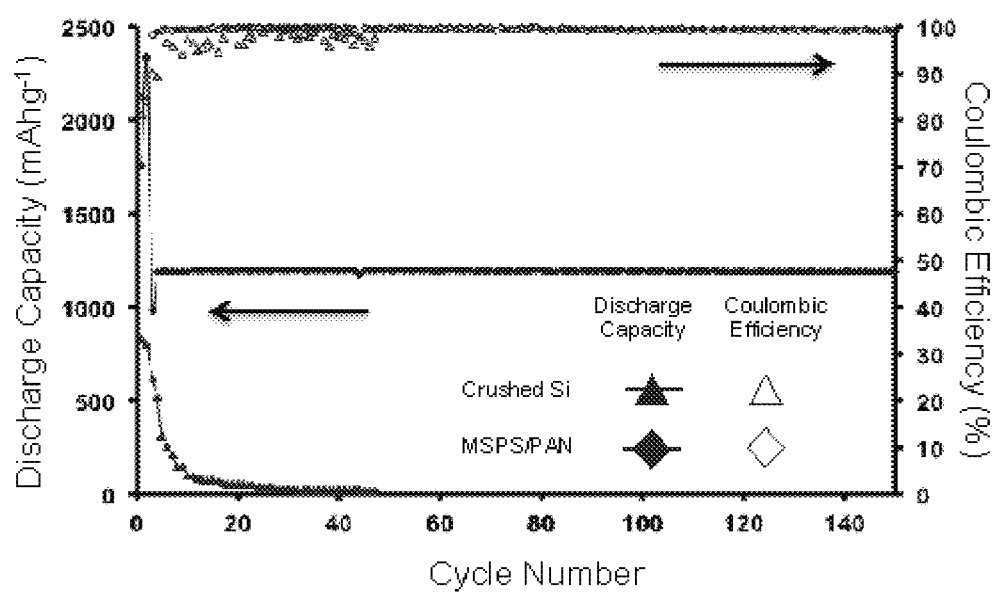
Figure 10:
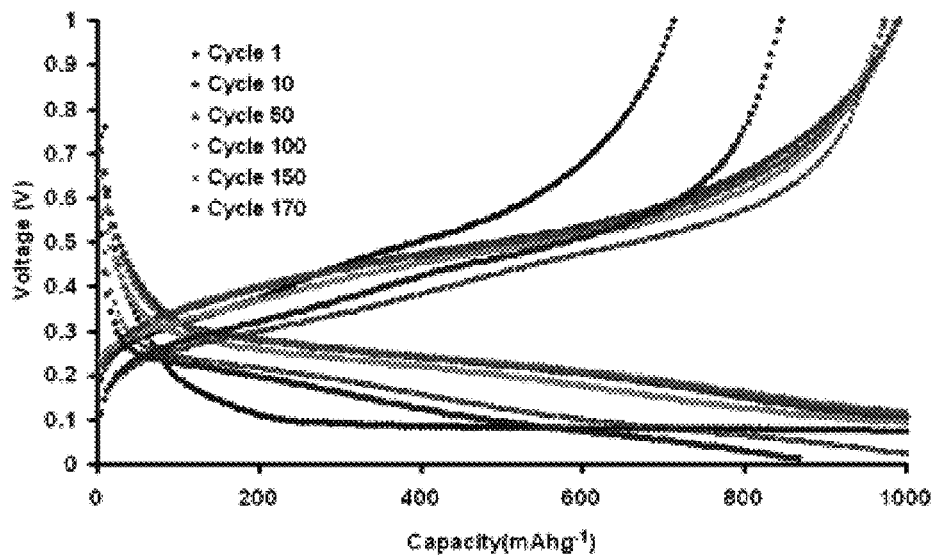
Figure 10:
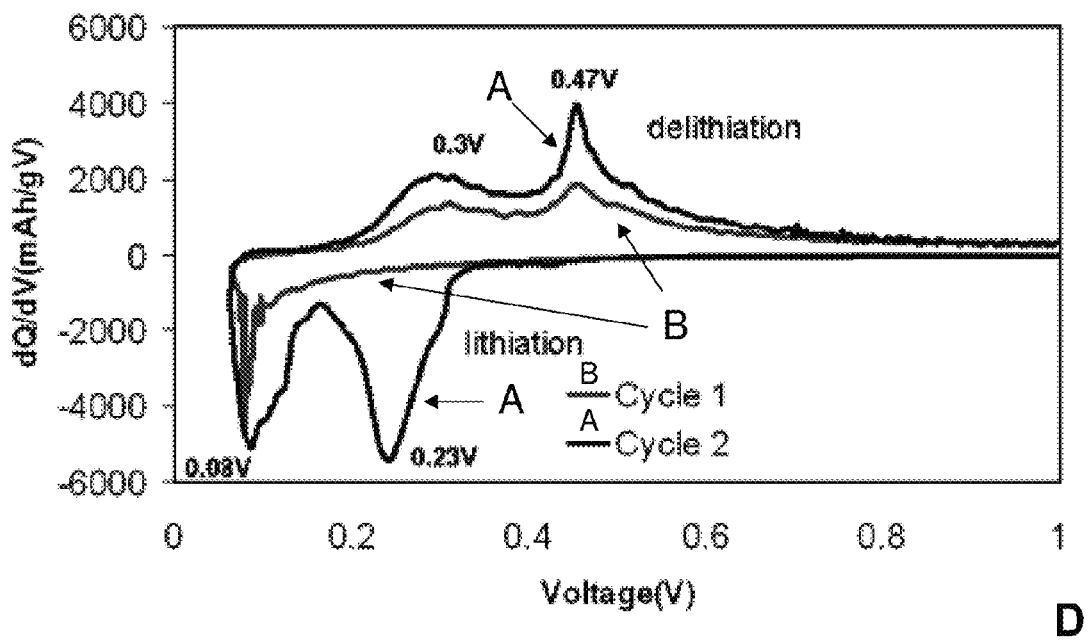

FIG. 10B compares the electrochemical performance of macroporous vs crushed silicon particulates with pyrolyzed PAN for optimized sample C. For the first two cycles, the porous (MPSP) and non-porous silicon micro-particulates (NPSP) were charged/discharged at 200 µAcm$^{-2}$ between 0.07-1V. After the third cycle, the cell was charged/discharged between 0.01-1V at a constant charge capacity of 1200 mAhg$^{-1}$. The MPSPs show good cycling stability with an average discharge capacity retention of 99% after 150 cycles, which was much better than the crushed silicon micro-particulates.

It was previously shown that silicon microparticles (8 μm and 15 μm diameters) with carbonized PAN and uniform coating of a Si by CVD have poor cycleability. Applicants also made similar observations for the crushed silicon particulates, as shown by the brown lines in FIG. 10B.

Interestingly, for Samples A-D, the full voltage range is not utilized initially, as shown by the voltage profiles in FIG. 10C at a rate of C/5. In particular, for Sample C, for the first 10 cycles, the lower cut-off voltage continues to increase with each cycle. After 10 cycles, the material reaches a charge capacity of 1000 mAhg$^{-1}$ close to 100 mV at C/5. The material charged/discharged between these limits for 170 cycles. Once the cell reaches its lower cut-off voltage (0.01V) at 170 cycles, the capacity begins fading. This indicates that material degradation occurs once the lower cut-off voltage is reached.

FIG. 10D shows the differential capacity curve for macroporous silicon micro-particulates for the 1$^{st}$ and 2$^{nd}$ cycles. The differential capacity curve for the 1$^{st}$ cycle during lithiation (Li insertion) shows only one broad peak from 0.23V to 0.08V, which is due to the phase transition of crystalline LixSi to amorphous Li$_{15}$Si$_4$. During delithiation (Li Extraction), the differential capacity peaks at 0.3V and 0.47V are from the phase transition between different amorphous Li$_x$Si phases. However, such broad peaks are also observed for very small crystallites less than 20 nm in size. Thus, Applicants cannot rule out the possibility for the presence of nanosized LixSi crystallites. The lithiation for the second cycle shows extra peaks at 0.24V, which corresponds to a higher voltage lithiation of amorphous Si—Li phase. Other peaks were previously reported at 0.05V, which are not present in this system, which can be attributed to their material lithiating at a lower cut off voltage (>100 mV) for the initial 200 cycles due to constant charge capacity. The increase in the delithiation peaks height after 1$^{st}$ cycle indicates improvement in lithium extraction kinetics.

Figure 11:
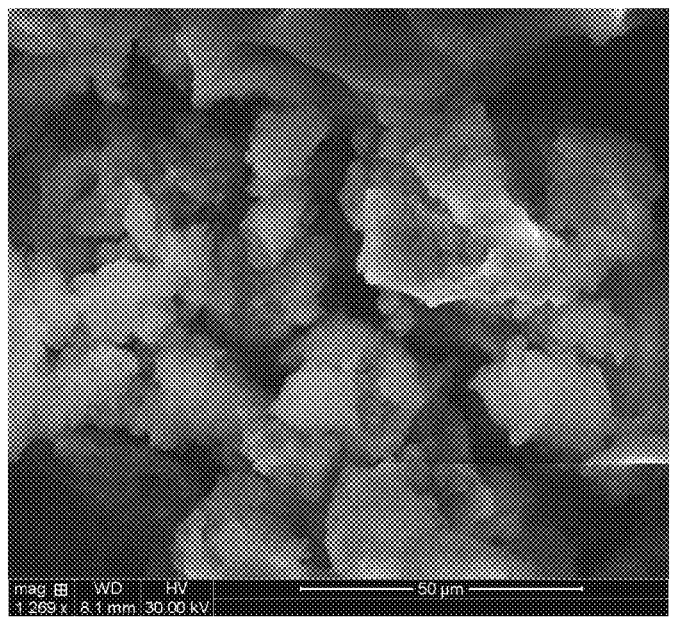
FIG. 11 provides various SEM images of porous silicon particles.
Figure 11:
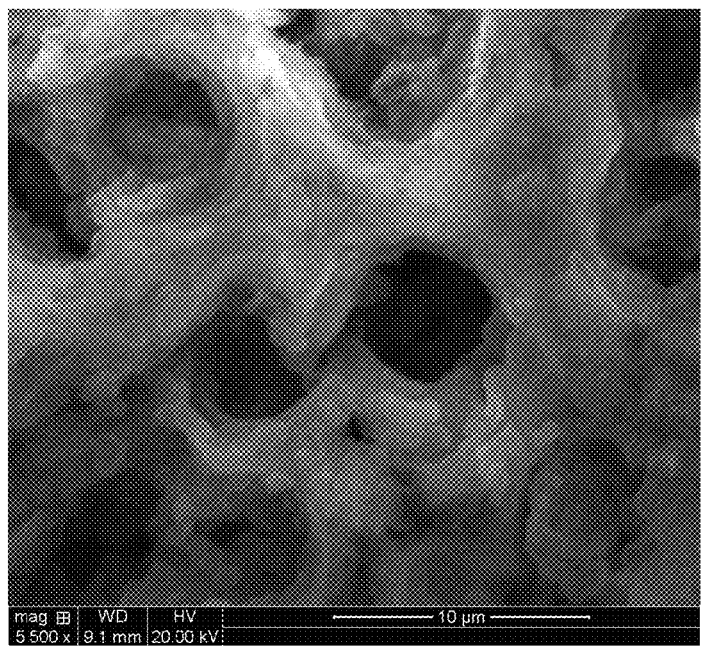

MPSPs have high capacity and large cycle life, as compared to the crushed silicon micro-particulates, as well as silicon microparticles and nanoparticles, as previously reported. The better performance of the macroporous material in comparison to the non-porous materials is due to the porosity, which can better accommodate the volume expansion of the silicon when alloying with lithium. SEM images for the crushed and macroporous silicon micro-particulates after 50 cycles are shown in FIGS. 11A-B, respectively. The crushed silicon has large observable cracks, while the macroporous silicon has observable pores.

To increase the cycle life of the material, Applicants tested the optimized sample C with fluorinated ethylene carbonate electrolyte (FEC). The mass of tested electrode for sample C is 2 mgcm$^{-2}$ and has a theoretical capacity of approximately 2500 mAhg$^{-1}$. Sample C is charged/discharged at a constant charge capacity of 1000 mAhe at rate of C/5 and C/2 between 1-0.01V by using the fluorinated electrolyte.

Figure 12:
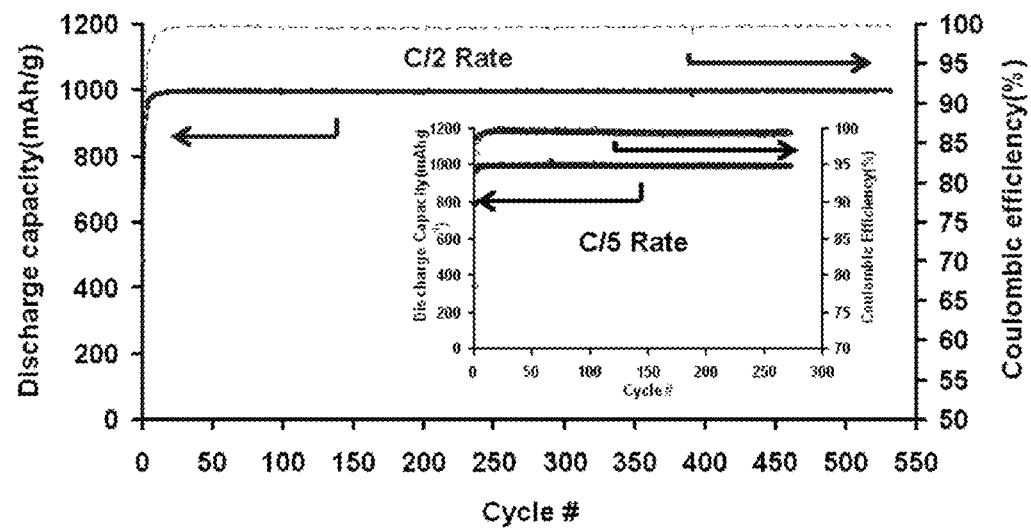
FIG. 12 provides data relating to the electrochemical performance of the macroporous silicon micro-particulates/pyrolyzed PAN composite with fluorinated electrolyte.
Figure 12:
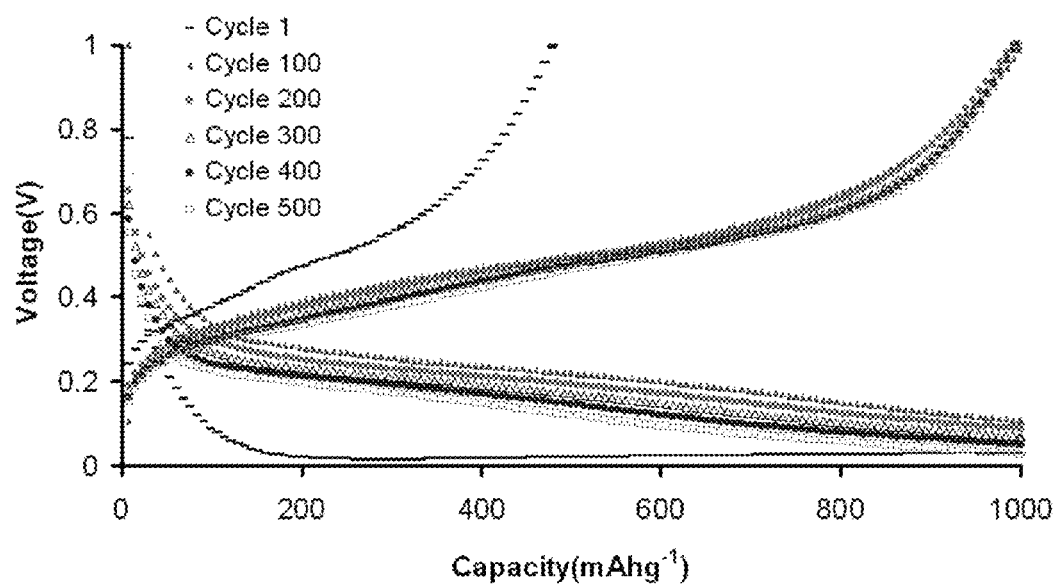

FIG. 12A shows the discharge capacity and coulombic efficiency of MPSPs versus cycle number at cycle rates of C/2. The capacity and coulombic efficiency of MPSP/PPAN composite versus cycle number at cycle rates of C/5 is provided in the insert of FIG. 12A. The coulombic efficiency for the first cycle is low (50% at C/2 and 82% at C/5). From the third cycle and onward, the coulombic efficiency is more than 99% and remains relatively stable over 550 cycles at C/2. The first cycle loss in the coulombic efficiency is related to the solid electrolyte interface (SEI) formation.

FIG. 12B shows the voltage profile of the sample C. Using the same constant charge capacity test as used for Samples A-D, the MPSP/PPAN composite with fluorinated electrolyte (FEC) showed a much slower change in the charge voltage range as compared to non-fluorinated electrolyte (FIG. 10C). The voltage profile in FIG. 12B shows that the charge voltage for the fluorinated electrolyte is dropping very slowly even after 500 cycles.

These results show that MPSPs with pyrolyzed PAN have high porosity, which is able to accommodate the volume expansion associated with the lithiation of silicon. The stability and specific capacity is comparable or oftentimes better than reported silicon micro and nanostructures. Combined with the low cost processing for large quantities of active material, MPSPs have the potential to transform the energy storage landscape.

Example 3.1

Sample Preparation

The multistep lift-off process is used to remove a freestanding film of the macroporous silicon microstructure from the bulk silicon substrate. The freestanding hydrogen-terminated porous silicon film was then rinsed with methanol and DI water to remove any residues. Macroporous silicon particulates are synthesized by sonicating (Branson 1210R-dth, 80 W, 47 KHz) 1 g of free-standing macroporous silicon (MPS) into 10 ml of dimethylformamide (DMF, Sigma Aldrich). A solution of 1 g of polyacrylonitrile (PAN, Sigma Aldrich) was dissolved into 10 ml of DMF over 4 hours with stirring at 60° C. Then the PAN solution is mixed with the previously prepared macroporous silicon particulates at ratios of 3:2, 7:3, 4:1 and 9:1, by stirring at the same temperature for 6 hours. The slurry is coated into the 25 μm thick stainless steel foil (Type, 304 Alfa Aesar) and heated for one hour at 550° C. under an argon atmospheres.

Example 3.2

Sample Characterization

The weight % of the macroporous silicon micro-particulates and PAN was estimated by using the high-precision analytic balance (AND HR-202i, A&D company). The mass of the active materials was estimated by same analytic balance after pyrolyzing the PAN. SEM and EDAX observations were carried out by using a Quanta 400 ESEM (FEI) that has a resolution of 1.2 nm at 30 Kv and is equipped with an EDX detector. The XRD studies were carried out using a Rigaku D/Max Ultima II Powder equipped with an incident monochromator and vertical theta/theta goniometer. The system used only the Kα1 component of Cu radiation, improving the overall quality of the collected powder diffraction data. An accelerating voltage of 40 Kv, current of 40 mA and 2θ-step of 0.02 were selected. The XRD data analysis was done by JADE software (Materials Data Inc.). The surface analysis was done by PHI Quantera Scanning X-Ray Microprobe. The pass energy was 26.0 eV for elemental scans and 140.0 eV for survey scans. X-ray source was monochromatic Al Kα (1486.7 eV) and beam size was 200 um. The nitrogen adsorption and desorption isotherm were collected at 77K in range of relative pressure of 0.0001-0.99P/P$_o$ using ASAP 2012 surface area measurement system from (Micromeritics). After drying the 250 mg of sample under vacuum for 24 hours it was degassed under N$_2$ gas flow at 250° C. for 12 hours before weighting and gas sorption measurements. The relative pressure range P/P$_o$ from 0.01 to 0.08 was used for multipoint Brunauer-Emmett-Teller (BET) calculations.

Example 3.3

Electrochemical Testing

A three and two electrode electrochemical cell (Hosen Test cell, Hohsen Corp. Japan) was used for all electrochemical measurements. Working electrode was prepared by drop casting the slurry of composite of macroporous silicon microparticulates/PAN on stainless steel and pyrolyzed at 550 degree centigrade at Ar atmosphere. Lithium foil (0.75 mm thick, Alfa Aesar) was used as a counter electrode. A monolayer polypropylene membrane (Celgard 2400) wetted with an electrolyte is used as a separator. The electrolyte used was 1 M $LiPF_6$ in a 1:1 ratio w/w ethylene carbonate:diethyl carbonate (Ferro Corporation) and 1:1 ratio w/w FEC (Ferro Corporation):dimethyl carbonate (Sigma Aldrich). The anode material is not exposed to air before assembling into the cell. All the cells were assembled in an argon-filled glove box (<5 ppm of oxygen and water, Vacuum Atmospheres Co.). The electrochemical testing is performed using Arbin Instruments' BT2000. Our anode material is charge/discharge between 0.01 and 1 V versus Li/Li+ at C/5 and C/2 for constant charge capacity (CCC). The coulombic efficiency was calculated as 100%*(delithiation capacity/lithiation capacity).

BET is also performed on commercial silicon nanoparticles (<100 nm) purchased from sigma Aldrich as well as bulk silicon micro-particulates. The surface area of the bulk silicon micro-particulates is quite small as compared to the macroporous silicon micro-particulates. The SEM images show only the macroporous silicon where as the t-plot show the presence of the microporous microparticles. The BET surface area for the macroporous silicon micro-particulates is compared with silicon nanoparticles. Both the BET surface area calculations were done at the same relative pressure range $P/P_o$ from 0.01 to 0.08. The BET surface area for macroporous silicon micro-particulates was 46.84 $m^2/g$, whereas for silicon nanoparticles is 34.86 $m^2/g$. It shows that surface area of macroporous is greater than that of the silicon nanoparticles due to the pores nature of the micro-particulates.

Example 4

Additional Characterizations

Figure 13:
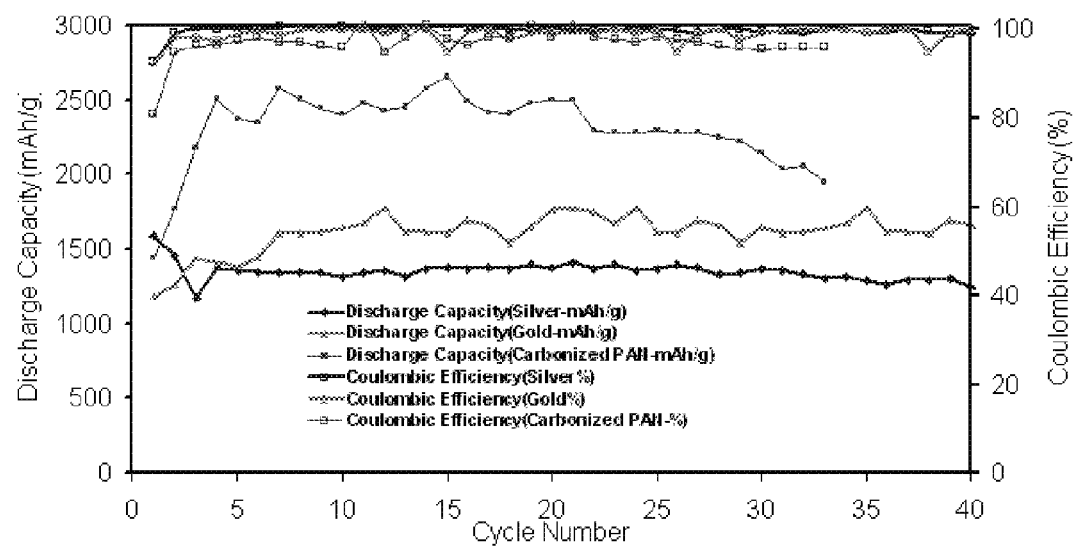
FIG. 13 is a graph illustrating the discharge capacity and efficiency of an anode material as a function of cycle number. The anode material was derived from a PAN-coated porous silicon film. The discharge capacity was tested during a galvanostatic charge/discharge test at 100 μA/cm$^2$.

This Example provides additional characterizations of various macroporous silicon films and macroporous silicon particles, as previously described. In one experiment, Applicants infiltrated PAN into macroporous silicon films (MPSF), as previously described in Example 1. Next, the PAN was carbonized at 550° C. in an inert argon atmosphere. FIG. 13 shows the cycle performance of porous silicon/carbonized PAN composite in comparison with metal coated porous silicon samples. The mass of the MPSF before and after infiltrating and coating the slurry was measured. The mass of the active layer was calculated and added to the mass of the coating. Additional data with respect to this experiment is shown in Example 1 and FIG. 4.

Without further elaboration, it is believed that one skilled in the art can, using the description herein, utilize the present disclosure to its fullest extent. The embodiments described herein are to be construed as illustrative and not as constraining the remainder of the disclosure in any way whatsoever. While the embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

What is claimed is:

1. An anode material for lithium ion batteries, wherein the anode material comprises:
   a porous silicon particle comprising a silicon component, wherein the silicon component comprises a plurality of pores in the silicon component,
      wherein the plurality of pores comprise at least one pore that spans an entire thickness of the silicon component; and
   a binding material associated with the silicon component, wherein the binding material comprises pyrolyzed polyacrylonitrile, and wherein the pyrolyzed polyacrylonitrile is infiltrated into the plurality of pores of the silicon component.

2. The anode material of claim 1, wherein the plurality of pores comprise diameters between about 1 nanometer to about 5 micrometers.

3. The anode material of claim 1, wherein the plurality of pores comprise diameters between about 500 nanometer to about 3 micrometers.

4. The anode material of claim 1, wherein the porous silicon particle comprises a diameter that ranges from about 1 μm to about 50 μm.

5. The anode material of claim 1, wherein the anode material has a capacity of at least about 600 mAh/g, and a coulombic efficiency of at least about 90%.

6. The anode material of claim 1, wherein each of the plurality of pores span an entire thickness of the silicon component.

\* \* \* \* \*